(12) United States Patent
Okanishi et al.

(10) Patent No.: US 9,624,362 B2
(45) Date of Patent: Apr. 18, 2017

(54) PROCESSING AID, AND COMPOSITION

(71) Applicant: DAIKIN INDUSTRIES, LTD., Osaka-shi, Osaka (JP)

(72) Inventors: Ken Okanishi, Settsu (JP); Yoshichika Komiya, Settsu (JP); Takafumi Yamato, Settsu (JP); Tsuyoshi Miyamori, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/899,596

(22) PCT Filed: Jun. 3, 2014

(86) PCT No.: PCT/JP2014/064735
§ 371 (c)(1),
(2) Date: Dec. 18, 2015

(87) PCT Pub. No.: WO2014/203727
PCT Pub. Date: Dec. 24, 2014

(65) Prior Publication Data
US 2016/0145368 A1 May 26, 2016

(30) Foreign Application Priority Data

Jun. 21, 2013 (JP) .................. 2013-130778
Mar. 11, 2014 (JP) .................. 2014-047971

(51) Int. Cl.
| | | |
|---|---|---|
| *C08L 23/00* | (2006.01) | |
| *C08F 214/18* | (2006.01) | |
| *C08F 214/26* | (2006.01) | |
| *C08L 27/18* | (2006.01) | |
| *C08L 23/06* | (2006.01) | |
| *C08L 23/12* | (2006.01) | |
| *C08L 27/06* | (2006.01) | |
| *C08L 25/06* | (2006.01) | |
| *C08L 23/04* | (2006.01) | |
| *C08L 23/08* | (2006.01) | |

(52) U.S. Cl.
CPC .......... *C08L 23/00* (2013.01); *C08F 214/265* (2013.01); *C08L 23/04* (2013.01); *C08L 23/06* (2013.01); *C08L 23/08* (2013.01); *C08L 23/12* (2013.01); *C08L 25/06* (2013.01); *C08L 27/06* (2013.01); *C08L 27/18* (2013.01); *C08L 2205/02* (2013.01)

(58) Field of Classification Search
CPC ...... C08F 10/02; C08F 14/26; C08F 214/265; C08L 27/04; C08L 27/06; C08L 27/08
See application file for complete search history.

(56) References Cited

U.S. PATENT DOCUMENTS

| | | | | |
|---|---|---|---|---|
| 4,855,360 | A | 8/1989 | Duchesne et al. | |
| 5,013,792 | A | 5/1991 | Chapman, Jr. et al. | |
| 6,133,389 | A * | 10/2000 | Anolick | C07C 313/20 |
| | | | | 526/206 |
| 6,455,658 | B1 * | 9/2002 | Okanishi | C08F 210/02 |
| | | | | 526/242 |
| 6,642,310 | B2 * | 11/2003 | Chapman, Jr. | C08F 214/18 |
| | | | | 525/101 |
| 7,820,774 | B2 * | 10/2010 | Aida | C08F 214/265 |
| | | | | 525/199 |
| 2003/0018148 | A1 * | 1/2003 | Kaspar | C08F 2/38 |
| | | | | 526/209 |
| 2004/0242771 | A1 * | 12/2004 | Kubo | C08G 65/007 |
| | | | | 525/55 |
| 2007/0232754 | A1 | 10/2007 | Aida et al. | |

FOREIGN PATENT DOCUMENTS

| | | | |
|---|---|---|---|
| JP | 2-70737 | A | 3/1990 |
| JP | 3-505347 | A | 11/1991 |
| JP | 4-501393 | A | 3/1992 |
| JP | 2002-544358 | A | 12/2002 |
| JP | 2002-544359 | A | 12/2002 |
| JP | 2007-510003 | A | 4/2007 |
| JP | 4181042 | B2 | 11/2008 |
| WO | 91/04842 | A1 | 4/1991 |
| WO | 91/05021 | A1 | 4/1991 |
| WO | 00/69967 | A1 | 11/2000 |
| WO | 00/69972 | A1 | 11/2000 |
| WO | 03/040232 | A1 | 5/2003 |
| WO | 03/044088 | A1 | 5/2003 |
| WO | 2005/019334 | A1 | 3/2005 |
| WO | 2011/025052 | A1 | 3/2011 |

OTHER PUBLICATIONS

International Preliminary Report on Patentability dated Dec. 22, 2015, issued by the International Bureau in corresponding International Application No. PCT/JP2014/064735.
Communication dated Sep. 21, 2016, from the European Patent Office in counterpart European application No. 14814500.6.
International Search Report for PCT/JP2014/064735 dated Sep. 2, 2014 [PCT/ISA/210].

* cited by examiner

*Primary Examiner* — Marc Zimmer
(74) *Attorney, Agent, or Firm* — Sughrue Mion, PLLC

(57) ABSTRACT

The present invention provides a processing aid for polyolefins which can eliminate melt fracture occurring at the start of molding in a short time even when a polyolefin, which is a melt-processable polymer, is extrusion-molded at a high speed. The present invention also aims to provide a polyolefin composition containing such a processing aid for polyolefins and a polyolefin. The processing aid for polyolefins contains an ethylene/tetrafluoroethylene copolymer as the only fluoropolymer, the ethylene/tetrafluoroethylene copolymer having a melting point of 170° C. to 270° C.

5 Claims, 6 Drawing Sheets

PROCESSING AID, AND COMPOSITION

CROSS REFERENCE TO RELATED APPLICATIONS

This application is a National Stage of International Application No. PCT/JP2014/064735, filed on Jun. 3, 2014, which claims priority from Japanese Patent Application No. 2013-130778, filed on Jun. 21, 2013, and Japanese Patent Application No. 2014-047971, filed on Mar. 11, 2014, the contents of all of which are incorporated herein by reference in their entirety.

TECHNICAL FIELD

The present invention relates to a processing aid and a composition. More specifically, the present invention relates to a processing aid suitable for processing a melt-processable polymer, and a composition.

BACKGROUND ART

In processing of a melt-processable polymer, the polymer needs to be extruded at a high speed for improvement in the productivity and reduction in the cost. However, every melt-processable polymer composition has a critical shear rate, and an extrusion speed higher than this rate causes a phenomenon called melt fracture in which the surface becomes rough, which fails to produce a favorable molded article.

One method of eliminating the problem to achieve a higher extrusion speed and enhance the extrusion properties without causing melt fracture is a molding method performed at a higher molding temperature. However, the high-temperature molding involves pyrolysis of the melt-processable polymer which causes problems such as a decrease in the mechanical properties of the resulting molded article and discoloring of the molded article. Also, the high-temperature molding involves a decrease in the melt viscosity of the melt-processable polymer, which unfortunately leads to sagging or deformation before the molded article is solidified by cooling, decreasing the dimensional accuracy of the molded article.

In view of these problems, Patent Literature 1 discloses a process of producing an extrudable composition, including mixing together simultaneously i) 0.001 to 10 weight percent, based on total weight of the extrudable composition, of a first fluoroelastomer having a first Mooney viscosity ML (1+10) at 121° C. measured in accordance with ASTM D-1646, ii) 0.001 to 10 weight percent, based on total weight of the extrudable composition, of a second fluoroelastomer having a second Mooney ML (1+10) at 121° C. in accordance with ASTM D-1646, and iii) a non-fluorinated melt processable polymer, wherein the difference between said first and second Mooney viscosities is at least 15.

Patent Literature 2 discloses a method including the steps of forming a melt processable polymer composition comprising a melt-processable thermoplastic host polymer and an effective amount of a processing additive composition containing a specific multimodal fluoropolymer; mixing the processing additive composition and the host polymer for a time sufficient to blend them together, and melt processing the polymer composition.

Patent Literature 3 discloses, as a technology utilizing a fluoropolymer as a processing aid, an extrudable composition containing a thermoplastic hydrocarbon polymer, a poly(oxyalkylene) polymer, and a fluorocarbon polymer.

Patent Literature 4 discloses an extrudable composition comprising: a resin blend comprising a metallocene catalyzed linear low density polyethylene resin and a low density polyethylene resin; a fluoroelastomer having a Mooney viscosity ML (1+10) at 121° C. between 30 and 60; and an interfacial agent. Patent Literature 5 discloses a processing aid comprising a fluoropolymer having an acid value of not lower than 0.5 KOHmg/g.

These disclosed technologies, however, cannot achieve the effect of preventing occurrence of melt fracture under high shear rate conditions where the shear rate is higher than 800 $\text{sec}^{-1}$.

In order to prevent occurrence of melt fracture under high shear rate conditions where the shear rate is higher than 800 $\text{sec}^{-1}$, Patent Literature 6 discloses a processing aid composition for difficultly melt-processable polymers, consisting essentially of: 2-95 parts by weight of a fluorocarbon copolymer which at the melt-processing temperature of the difficultly melt-processable polymer is either in a melted form if crystalline or is above its glass transition temperature if amorphous; and 98-5 parts by weight of a tetrafluoroethylene homopolymer or copolymer of tetrafluoroethylene and a monomer which is copolymerizable therewith, wherein the mole ratio of fluorine to hydrogen is at least 1:1, and which is solid at the melt-processing temperature of the difficultly melt-processable polymer.

Patent Literature 7 discloses a low-temperature-decomposable engineering plastic resin composition which is conducive to improved molding processability in consideration of extrusion pressure, extrusion torque and other process parameters in the molding of low-temperature-decomposable engineering plastics. The low-temperature-decomposable engineering plastic resin composition prepared by formulating a low-temperature-decomposable engineering plastic with a fluorine-containing resin, wherein said low-temperature-decomposable engineering plastic has a melting point of not higher than 200° C. and a decomposition temperature of not higher than 300° C., and wherein said fluorine-containing resin is a resin comprising a fluorine-containing polymer, said fluorine-containing polymer having a fluorine atom and at least one atom species selected from the group consisting of hydrogen atom, chlorine atom, bromine atom and iodine atom, said fluorine atom and said at least one atom species being bound to a non-terminal carbon atom constituting a main chain, and said fluorine-containing polymer having substantially no polar functional groups reactive to the low-temperature-decomposable engineering plastic.

CITATION LIST

Patent Literature

Patent Literature 1: JP 4181042 B
Patent Literature 2: JP 2002-544358 T
Patent Literature 3: JP H02-70737 A
Patent Literature 4: JP 2007-510003 T
Patent Literature 5: WO 2011/025052
Patent Literature 6: U.S. Pat. No. 5,013,792
Patent Literature 7: WO 03/044088

SUMMARY OF INVENTION

Technical Problem

As described above, in processing of a melt-processable polymer, technologies have been developed to prevent occurrence of melt fracture under high shear rate conditions where the shear rate is higher than 800 sec$^{-1}$. For example in Patent Literature 6, the processing aid contains an essential component of a fluorocarbon copolymer which at the melt-processing temperature is either in a melted form if crystalline or is in an amorphous state if amorphous, and the other essential component copolymer is solid at the melt-processing temperature. Here, this document does not mention whether a copolymer of tetrafluoroethylene and a monomer copolymerizable with tetrafluoroethylene which is in a melted form at the melt-processing temperature provides the effect. Also, in Patent Literature 7, a low-temperature-decomposable engineering plastic other than a polyolefin resin is the subject resin.

Given this current state of the art, the present invention provides a processing aid for polyolefins which can eliminate melt fracture occurring at the start of molding in a short time even when a polyolefin, which is a melt-processable polymer, is extrusion-molded at a high speed.

The present invention also provides a polyolefin composition containing such a processing aid for polyolefins and a polyolefin.

Solution to Problem

The present inventors have made intensive studies on processing aids for polyolefins, and have found that a processing aid containing an ethylene/tetrafluoroethylene copolymer as the only fluoropolymer can eliminate melt fracture occurring at the start of molding in a short time even when a polyolefin is extrusion-molded at a high shear rate. Also, the inventors have found that the above processing aid, when simply added in a small amount to the polyolefin, is dispersed as particles in the polyolefin and has an average dispersed particle size of 10 μm or smaller in the polyolefin, enabling elimination of melt fracture in a time equivalent to those of conventional technologies.

The present inventors made the present invention solving these problems by utilizing a processing aid for polyolefins which contains an ethylene/tetrafluoroethylene copolymer as the only fluoropolymer.

That is, the present invention relates to a processing aid for polyolefins, an ethylene/tetrafluoroethylene copolymer as the only fluoropolymer.

The ethylene/tetrafluoroethylene copolymer has a melting point of 170° C. to 270° C.

Preferably, the ethylene/tetrafluoroethylene copolymer consists of an ethylene-based polymerization unit (a), a tetrafluoroethylene-based polymerization unit (b), and a polymerization unit (c) based on a monomer represented by the following formula (1):

$$CH_2=CXY \quad (1)$$

wherein X represents a hydrogen atom or a fluorine atom, and Y represents a fluoroalkyl group, the copolymer has a mol % ratio (a)/(b) of the polymerization unit (a) to the polymerization unit (b) of 50 to 10/50 to 90, and the copolymer contains the polymerization unit (c) in a proportion of 0 to 10 mol % based on the total amount of the polymerization unit (a) and the polymerization unit (b).

Preferably, the monomer represented by formula (1) is a monomer represented by the following formula (2):

$$CH_2=CX-(CF_2)_nZ \quad (2)$$

wherein X and Z are the same as or different from each other and each represent a hydroxy atom or a fluorine atom, and n is an integer of 2 to 8.

Preferably, the ethylene/tetrafluoroethylene copolymer contains, at a main chain terminal or in a side chain, at least one group selected from the group consisting of —CONH$_2$, —OCOOR wherein R is a C1-C6 alkyl group, —CH$_2$OH, —COF, and —COOH.

The processing aid for polyolefins preferably further contains 1 to 99 wt % of at least one surfactant selected from the group consisting of silicone/polyether copolymers, aliphatic polyesters, aromatic polyesters, polyether polyols, amine oxides, carboxylic acids, aliphatic esters, and poly(oxyalkylenes).

The present invention also relates to a polyolefin composition containing the above processing aid for polyolefins, and a polyolefin, the processing aid for polyolefins constituting 0.0005 to 10 wt % of the total weight of the composition, the processing aid for polyolefins being dispersed as particles in the polyolefin, the processing aid for polyolefins having an average dispersed particle size of 10 μm or smaller in the polyolefin.

Preferably, the polyolefin is at least one selected from the group consisting of low density polyethylene, linear low density polyethylene, high density polyethylene, metallocene-catalyzed linear low density polyethylene, polypropylene, polystyrene, and polyvinyl chloride.

The present invention is described in detail below.

The processing aid for polyolefins of the present invention contains an ethylene/tetrafluoroethylene copolymer as the only fluoropolymer, and may contain any components other than the fluoropolymer as long as the only fluoropolymer contained is an ethylene/tetrafluoroethylene copolymer. The ethylene/tetrafluoroethylene copolymer contained in the processing aid for polyolefins of the present invention may be composed of a single species or a mixture of two or more species.

The ethylene/tetrafluoroethylene copolymer contains at least an ethylene-based polymerization unit and a tetrafluoroethylene-based polymerization unit, and preferably consists of an ethylene-based polymerization unit (a), a tetrafluoroethylene-based polymerization unit (b), and a polymerization unit (c) based on a monomer copolymerizable with ethylene and tetrafluoroethylene. Here, the ethylene-based polymerization unit (a) is a repeating unit represented by —CH$_2$CH$_2$—, and the tetrafluoroethylene-based polymerization unit (b) is a repeating unit represented by —CF$_2$CF$_2$—.

The monomer copolymerizable with ethylene and tetrafluoroethylene may be any monomer that has a terminal C—C double bond and is copolymerizable with ethylene and tetrafluoroethylene. Here, the polymerization unit (c) based on a monomer copolymerizable with ethylene and tetrafluoroethylene is a moiety derived from the monomer in a polymer when the monomer is copolymerized to constitute part of the polymer.

Examples of the monomer copolymerizable with ethylene and tetrafluoroethylene include (fluoroalkyl)ethylenes represented by the following formula (1):

$$CH_2=CXY \quad (1)$$

wherein X represents a hydrogen atom or a fluorine atom, and Y represents a fluoroalkyl group. That is, in one preferred embodiment of the present invention, the ethylene/tetrafluoroethylene copolymer consists of an ethylene-based polymerization unit (a), a tetrafluoroethylene-based polymerization unit (b), and a polymerization unit (c) based on a monomer represented by the following formula (1):

$$CH_2=CXY \quad (1)$$

wherein X represents a hydrogen atom or a fluorine atom, and Y represents a fluoroalkyl group.

Also, the polymerization unit (c) based on a monomer represented by the above formula (1) is a repeating unit represented by —CH$_2$—CXY—.

Y in the above formula (1) represents a fluoroalkyl group, and the fluoroalkyl group may be a linear or branched chain. The number of carbon atoms in the fluoroalkyl group is preferably 2 to 10, more preferably 2 to 8, still more preferably 2 to 6.

The monomer represented by the above formula (1) is preferably a monomer represented by the following formula (2):

$$CH_2=CX-(CF_2)_nZ \qquad (2)$$

wherein X and Z are the same as or different from each other and each represent a hydroxy atom or a fluorine atom, and n is an integer of 2 to 8.

The n in the above formula (2) is an integer of 2 to 8, but is preferably an integer of 2 to 6.

Examples of the monomer represented by the above formula (2) include CH$_2$=CF(CF$_2$)$_2$F, CH$_2$=CF(CF$_2$)$_3$F, CH$_2$=CF(CF$_2$)$_4$F, CH$_2$=CF(CF$_2$)$_2$H, CH$_2$=CF(CF$_2$)$_3$H, CH$_2$=CF(CF$_2$)$_4$H, CH$_2$=CH(CF$_2$)$_2$H, CH$_2$=CH(CF$_2$)$_3$F, CH$_2$=CH(CF$_2$)$_4$F, CH$_2$=CH(CF$_2$)$_6$F, CH$_2$CH(CF$_2$)$_2$H, CH$_2$=CH(CF$_2$)$_3$H, and CH$_2$=CH(CF$_2$)$_4$H.

The examples of the monomer copolymerizable with ethylene and tetrafluoroethylene also include vinylidene fluoride, chlorotrifluoroethylene, vinyl fluoride, hexafluoropropylene, hexafluoroisobutene, perfluoro(alkyl vinyl ethers) represented by CF$_2$=CF—ORf$^1$ (wherein Rf$^1$ represents a C1-C8 perfluoroalkyl group), and alkyl perfluorovinyl ether derivatives represented by CF$_2$=CF—OCH$_2$—Rf$^2$ (wherein Rf$^2$ represents a C1-C5 perfluoroalkyl group).

The monomer copolymerizable with ethylene and tetrafluoroethylene is preferably a (fluoroalkyl)ethylene represented by the above formula (1) for its excellent transparency and excellent heat resistance, more preferably a (fluoroalkyl)ethylene represented by the above formula (2), still more preferably at least one selected from the group consisting of CH$_2$=CH(CF$_2$)$_6$F, CH$_2$=CF(CF$_2$)$_3$H, and CH$_2$=CH(CF$_2$)$_4$F.

Preferably, the ethylene/tetrafluoroethylene copolymer has a mol % ratio (a)/(b) of the ethylene-based polymerization unit (a) to the tetrafluoroethylene-based polymerization unit (b) of 50 to 10/50 to 90, and the copolymer contains the polymerization unit (c) based on a monomer copolymerizable with ethylene and tetrafluoroethylene in a proportion of 0 to 10 mol % based on the total amount of the polymerization unit (a) and the polymerization unit (b). If the ethylene/tetrafluoroethylene copolymer has a mol % ratio of the polymerization unit (a), the polymerization unit (b), and the polymerization unit (c) in such a range, melt fracture can be eliminated in a short time even in extrusion molding of a polyolefin with the processing aid of the present invention at a high speed. Also, the processing aid, when simply added in a small amount to a polyolefin, can eliminate melt fracture in a time equivalent to those of conventional technologies. The mol % ratio ((a)/(b)) is more preferably 45 to 10/55 to 90, still more preferably 38 to 25/62 to 75. Also, the proportion of the polymerization (c) based on the total amount of the polymerization unit (a) and the polymerization unit (b) is more preferably 0.01 to 5 mol %.

As described above, in another preferred embodiment of the present invention, the ethylene/tetrafluoroethylene copolymer consists of an ethylene-based polymerization unit (a), a tetrafluoroethylene-based polymerization unit (b), and a polymerization unit (c) based on a monomer represented by the following formula (1):

$$CH_2=CXY \qquad (1)$$

wherein X represents a hydrogen atom or a fluorine atom, and Y represents a fluoroalkyl group, the copolymer has a mol % ratio (a)/(b) of the polymerization unit (a) to the polymerization unit (b) of 50 to 10/50 to 90, and the copolymer contains the polymerization unit (c) in a proportion of 0 to 10 mol % based on the total amount of the polymerization unit (a) and the polymerization unit (b).

The proportion of each monomer unit herein is determined by $^{19}$F-NMR analysis.

Preferably, the ethylene/tetrafluoroethylene copolymer contains, at a main chain terminal or in a side chain, at least one group selected from the group consisting of —CONH$_2$, —OCOOR wherein R is a C1-C6 alkyl group, —CH$_2$OH, —COF, and —COOH. The ethylene/tetrafluoroethylene copolymer in the present invention containing such a functional group at a main chain terminal or in a side chain enhances the compatibility between the metal surface of a die and the processing aid to increase the pressure drop rate when used as a processing aid, thereby increasing the amount of pressure drop.

Here, appropriately selecting a polymerization initiator for polymerization or a monomer having the above functional group in a side chain enables introduction of the functional group into the ethylene/tetrafluoroethylene copolymer.

R in the group represented by —OCOOR is a C1-C6 alkyl group, preferably a C1-C5 alkyl group, more preferably a C1-C4 alkyl group, still more preferably a methyl, ethyl, n-propyl, iso-propyl, or sec-butyl group.

The ethylene/tetrafluoroethylene copolymer preferably has a melting point of 170° C. to 270° C., from the viewpoint of excellent heat resistance and excellent moldability. The ethylene/tetrafluoroethylene copolymer preferably has a melting point of 180° C. to 230° C., more preferably 190° C. to 220° C.

The melting point can be determined as a temperature corresponding to the local maximum on a melting endotherm in the case of raising the temperature at a rate of 10° C./min with a DSC device (Seiko Instruments Inc.).

The ethylene/tetrafluoroethylene copolymer preferably has a glass transition temperature of 50° C. to 120° C., more preferably 60° C. to 110° C., from the viewpoint of excellent heat resistance and excellent moldability.

The glass transition temperature can be determined by differential scanning calorimetry (DSC).

The ethylene/tetrafluoroethylene copolymer preferably has a melt flow rate (MFR) of 0.5 to 100 g/10 min, more preferably 40 g/10 min or lower but 4.0 g/10 min or higher.

The MFR can be calculated by measurement in accordance with ASTM D 3159 using a melt indexer (from Toyo Seiki Seisaku-sho, Ltd.).

The ethylene/tetrafluoroethylene copolymer can be obtained by a known polymerization method such as suspension polymerization, solution polymerization, emulsion polymerization, and bulk polymerization. In the above polymerization, the conditions (e.g. temperature, pressure), the polymerization initiator, and the other additives can be appropriately determined depending on the desired composition and amount of the copolymer.

The amount of the ethylene/tetrafluoroethylene copolymer in the processing aid is preferably 1 to 100% by mass.

The processing aid for polyolefins of the present invention may further contain a surfactant.

The surfactant contained can further enhance the performance of the ethylene/tetrafluoroethylene copolymer as a processing aid.

The surfactant is a compound that has a lower melt viscosity at a molding temperature than the ethylene/tetrafluoroethylene copolymer. The surfactant, when contained in the later-described polyolefin composition, is preferably a compound that has a lower melt viscosity at a molding temperature than the melt-processable resin, and can wet the ethylene/tetrafluoroethylene copolymer.

The surfactant is preferably at least one compound selected from the group consisting of silicone/polyether copolymers, aliphatic polyesters, aromatic polyesters, polyether polyols, amine oxides, carboxylic acids, aliphatic esters, and poly(oxyalkylenes). More preferred is a poly(oxyalkylene).

The poly(oxyalkylene) is preferably polyethylene glycol. The polyethylene glycol has a number average molecular weight of 50 to 20000, more preferably 1000 to 15000, still more preferably 2000 to 9500.

The number average molecular weight of the polyethylene glycol is a value calculated from the hydroxy value measured in accordance with JIS K0070.

The aliphatic polyester is preferably polycaprolactone. The polycaprolactone preferably has a number average molecular weight of 1000 to 32000, more preferably 2000 to 10000, still more preferably 2000 to 4000.

The amount of the surfactant in the processing aid is preferably 1 to 99 wt %, more preferably 5 to 90 wt %, still more preferably 10 to 80 wt %, particularly preferably 20 to 70 wt %. Here, the amount of the surfactant is preferably 50 wt % or more, more preferably more than 50 wt %.

The processing aid for polyolefins according to the present invention, when simply added to a small amount of a polyolefin, is dispersed as particles in the polyolefin, has an average dispersed particle size of 10 μm or smaller in the polyolefin, and enables elimination of melt fracture in a time equivalent to those of conventional technologies. As described above, one aspect of the present invention is a polyolefin composition containing the processing aid for polyolefins of the present invention, and a polyolefin, the processing aid for polyolefins constituting 0.0005 to 10 wt % of the total weight of the composition, the processing aid for polyolefins being dispersed as particles in the polyolefin, the processing aid for polyolefins having an average dispersed particle size of 10 μm or smaller in the polyolefin.

The polyolefin composition of the present invention containing the processing aid for polyolefins of the present invention and a polyolefin may contain any other components. Also, the processing aid for polyolefins and the polyolefin which are contained in the polyolefin composition of the present invention may each be composed of a single species or a mixture of two or more species.

The polyolefin preferably has a melt-processing temperature of 100° C. to 350° C. The polyolefin may be crystalline or non-crystalline.

In the case of a crystalline polyolefin, the polyolefin preferably has a melting point of 80° C. to 300° C., more preferably 100° C. to 200° C. In the case of a non-crystalline polyolefin, the polyolefin preferably has about the same processing temperature as a crystalline polyolefin having a melting point in the above ranges.

The melting point of a crystalline polyolefin can be determined with a DSC device.

The polyolefin is a polymer obtained by polymerizing α-olefins, such as polyethylene (PE), polypropylene (PP), an ethylene propylene copolymer, polystyrene (PS), AS resin (AS), ABS resin (ABS), methacrylic resin (PMMA), polymethylpentene (PMP), butadiene resin (BDR), polybutene-1 (PB-1), polyvinyl alcohol (PVA), polyacrylonitrile (PAN), polymethacrylic styrene (MS), an ethylene vinyl acetate copolymer (EVA), an ethylene vinyl alcohol copolymer, and polyvinyl chloride (PVC).

The polyolefin is preferably at least one selected from the group consisting of low density polyethylene (LDPE), linear low density polyethylene (LLDPE), metallocene-catalyzed linear low density polyethylene (mLLDPE), medium density polyethylene (MDPE), high density polyethylene, polypropylene (PP), polystyrene (PS), ethylene vinyl acetate copolymer (EVA), and polyvinyl chloride (PVC). The polyolefin is more preferably at least one selected from the group consisting of low density polyethylene, linear low density polyethylene, high density polyethylene, metallocene-catalyzed linear low density polyethylene, polypropylene, polystyrene, and polyvinyl chloride.

The polyolefin is still more preferably polyethylene, polypropylene, or polystyrene, particularly preferably polyethylene or polypropylene, most preferably polyethylene.

The polyolefin can be synthesized by a known method according to the species thereof.

The polyolefin may be in the form of powder, granules, or pellets, for example. In the polyolefin composition of the present invention, the polyolefin is preferably in the form of pellets from the viewpoint of efficient melting of the polyolefin and dispersion of the processing aid for polyolefins of the present invention.

In the polyolefin composition of the present invention, the processing aid for polyolefins is dispersed as fine particles in the polyolefin. A polyolefin composition in such a state can prevent formation of visually noticeable gels in a thin molded article, or molding failure such as poor smoothness of the surface.

In the polyolefin composition of the present invention, the processing aid for polyolefins has an average dispersion particle size of 10 μm or smaller in the polyolefin. A processing aid for polyolefins having an average dispersed particle size of 10 μm or smaller can more evenly stick to the surface of the die.

The processing aid for polyolefins preferably has an average dispersed particle size of 7 μm or smaller, more preferably 5 μm or smaller, still more preferably 3 μm or smaller.

The lower limit for the average dispersed particle size is not particularly limited, and may be 0.1 μm or smaller.

The average dispersed particle size of the processing aid for polyolefins can be determined by observing the polyolefin composition with a confocal laser scanning microscope, or observing an ultra-thin piece cut out from a pressed sheet or pellets produced from the polyolefin composition of the present invention, with a transmission electron microscope or a reflection-type optical microscope; and then binarizing the obtained image with an optical analyzer.

The polyolefin composition of the present invention containing the processing aid for polyolefins of the present invention and the polyolefin may contain other components if necessary. The other components may be, for example, an anti-blocking agent; an ultraviolet absorber; a flame retardant; a reinforcing agent such as glass fibers and glass powder; a stabilizer such as mineral and flakes; a lubricant such as silicone oil and molybdenum disulfide; a pigment such as titanium dioxide and red iron oxide; a conducting agent such as carbon black; an impact-resistance improver such as rubber; a hindered phenolic or phospholic antioxidant; a nucleating agent such as a metal salt and an acetal of sorbitol; or any other additive in the positive list defined as the voluntary standards by Japan Hygienic Olefin And Styrene Plastics Association.

For example, the polyolefin composition of the present invention may contain an anti-blocking agent, and a polyolefin composition containing 1 to 30 parts by weight of the anti-blocking agent for each 100 parts by weight of the ethylene/tetrafluoroethylene copolymer is also preferred. The anti-blocking agent can suppress blocking of the ethylene/tetrafluoroethylene copolymer. The amount of the anti-blocking agent in the composition is preferably 3 to 20 parts by weight, more preferably 5 to 15 parts by weight, for each 100 parts by weight of the ethylene/tetrafluoroethylene copolymer.

The anti-blocking agent may be composed of a single species or a mixture of two or more species.

The anti-blocking agent is preferably inorganic compound powder. For example, the inorganic compound powder is preferably one included in examples of the following additives including a plasticizer, a filler, a colorant, an acid acceptor, and a heat stabilizer.

The anti-blocking agent can be one usually used as a plasticizer, a filler, a colorant, an acid acceptor, or a heat stabilizer, for example.

Examples of the plasticizer include dioctyl phthalate and dicresyl phthalate.

Examples of the filler include barium sulfate, calcium carbonate, graphite, talc, and silica.

Examples of the colorant include metal oxides such as titanium oxide, iron oxide, and molybdenum oxide.

Examples of the acid acceptor include magnesium oxide, calcium oxide, and lead oxide.

Examples of the heat stabilizer include calcium stearate and magnesium stearate.

The anti-blocking agent is preferably any of the above fillers. More preferably, the anti-blocking agent is at least one selected from the group consisting of talc, silica, and calcium carbonate.

The anti-blocking agent is preferably powder having an average particle size of from 0.01 μm inclusive to 50 μm inclusive, more preferably from 0.05 μm inclusive to 30 μm inclusive, still more preferably from 0.1 μm inclusive to 10 μm inclusive. The average particle size of the anti-blocking agent is a value measured in accordance with ISO 13320-1. The anti-blocking agent may be surface-treated with a coupling agent if necessary.

In the polyolefin composition of the present invention, the processing aid for polyolefins constitutes 0.0005 to 10 wt % of the total weight of the composition. The polyolefin composition of the present invention, when containing the processing aid for polyolefins in a proportion in the above range, can be used as a molding material to obtain a molded article, or can be prepared into a processing aid masterbatch. The amount of the processing aid for polyolefins in the polyolefin composition of the present invention is preferably 0.001 to 7 wt %, preferably 0.0025 to 5 wt %, of the total weight of the composition.

Particularly when the polyolefin composition of the present invention is used as a molding material, the wt % ratio of the ethylene/tetrafluoroethylene copolymer to the polyolefin in the polyolefin composition of the present invention is preferably 1 to 0.0005 wt %, more preferably 0.5 to 0.001 wt %, still more preferably 0.2 to 0.0025 wt %.

The processing aid masterbatch prepared from the polyolefin composition of the present invention is suitable as a processing aid in molding of a polyolefin.

The processing aid masterbatch prepared from the polyolefin composition of the present invention contains the processing aid for polyolefins uniformly dispersed in a polyolefin, and therefore can, when added in molding of a polyolefin, reduce the extrusion torque and extrusion pressure to improve the molding processability of the polyolefin.

Here, the polyolefin can be any of the above-described polyolefins. The polyolefin is preferably polyethylene or polypropylene, more preferably polyethylene.

The processing aid masterbatch can be in any form such as powder, granules, or pellets, but is preferably in the form of pellets obtained by melt kneading because the processing aid for polyolefins of the present invention can then be kept in the finely dispersed state in the polyolefin.

The temperature for the melt kneading is preferably an extrusion temperature that is higher than the melting point of the ethylene/tetrafluoroethylene copolymer. The extrusion temperature is preferably higher than the melting point, more preferably 10° C. or more higher than the melting point.

The wt % ratio of the ethylene/tetrafluoroethylene copolymer to the polyolefin in the processing aid masterbatch is preferably 0.05 to 10 wt %, more preferably 0.1 to 5 wt %, from the viewpoint of facilitating the melt-molding.

The processing aid masterbatch containing the processing aid for polyolefins and the polyolefin may further contain other components if necessary.

Nonlimiting examples of the other components include the same ones as the above other components that can be contained in the composition of the present invention.

The processing aid masterbatch can be obtained by kneading a mixture of a polyolefin, an ethylene/tetrafluoroethylene copolymer and, if necessary the other components, at a temperature of 100° C. to 350° C.

As described above, yet another suitable embodiment of the present invention is use of a composition for molding a polyolefin, the composition containing a polyolefin, and an ethylene/tetrafluoroethylene copolymer containing an ethylene-based polymerization unit (a), a tetrafluoroethylene-based polymerization unit (b), and a polymerization unit (c) based on a monomer copolymerizable with ethylene and tetrafluoroethylene, the copolymer having a mol % ratio (a)/(b) of the polymerization unit (a) to the polymerization unit (b) of 50 to 10/50 to 90, the copolymer containing the polymerization unit (c) in a proportion of 0 to 10 mol % based on the total amount of the polymerization unit (a) and the polymerization unit (b), the copolymer having a wt % ratio of the ethylene/tetrafluoroethylene copolymer to the polyolefin of 0.05 to 10 wt %.

The present invention also relates to a molded article obtained by molding the polyolefin composition of the present invention.

The molding may be performed by introducing the pre-prepared polyolefin composition of the present invention into a molding machine, and melting and extruding the composition; by simultaneously introducing the ethylene/tetrafluoroethylene copolymer, a polyolefin and, if necessary, the other components into a molding machine, and melting and extruding the mixture; or by simultaneously introducing the processing aid masterbatch and the polyolefin into the molding machine, and melting and extruding the components.

The molding for the polyolefin composition is not particularly limited, and may be extrusion molding, injection molding, or blow molding. In particular, for effective achievement of the molding processability, extrusion molding is preferred.

The conditions for the molding are not particularly limited, and can be appropriately set depending on the composition and amount of the polyolefin composition used, and the shape and size of the desired molded article, for example.

Typically, the molding temperature for the molding is equal to or higher than the melting point of the polyolefin in the polyolefin composition of the present invention, and is lower than the lower decomposition temperature of the ethylene/tetrafluoroethylene copolymer and the polyolefin, in the range of 100° C. to 350° C.

The molding temperature in the case of extrusion molding may also be referred to as an extrusion temperature.

The molding can be performed at a high temperature and a high speed because, in particular, the polyolefin composition of the present invention can eliminate melt fracture occurring at the start of molding in a short time even when the extrusion molding is performed at a high speed, and because the processing aid containing the ethylene/tetrafluoroethylene copolymer as the only fluoropolymer enables elimination of melt fracture in a time equivalent to those of conventional technologies when simply added in a small amount to the polyolefin. For example, the molding may be carried out at a molding temperature of 220° C. or higher, or at a shear rate of 800 to 1200 $\sec^{-1}$.

As described above, another aspect of the present invention is a method for producing a molded article, including the steps of: obtaining a polyolefin composition by mixing a polyolefin and an ethylene/tetrafluoroethylene copolymer containing an ethylene-based polymerization unit (a), a tetrafluoroethylene-based polymerization unit (b), and a polymerization unit (c) based on a monomer copolymerizable with ethylene and tetrafluoroethylene, the copolymer having a mol % ratio (a)/(b) of the polymerization unit (a) to the polymerization unit (b) of 50 to 10/50 to 90, the copolymer containing the polymerization unit (c) in a proportion of 0 to 10 mol % based on the total amount of the polymerization unit (a) and the polymerization unit (b); and molding the polyolefin composition at 220° C. or higher to obtain a molded article. Production of a molded article by a production method including molding at such a high temperature can decrease the melt viscosity of the polyolefin which is a melt-processable polymer, whereby improvement in the moldability and improvement in the appearance of the molded article can be expected.

Yet another suitable embodiment of the present invention is in the above step of obtaining a molded article, the polyolefin composition is molded at a shear rate of 800 to 1200 $\sec^{-1}$. Such a production method includes molding at a high speed, and thus improvement in the productivity can be expected.

In the step of obtaining a polyolefin composition in the above production method, the composition is preferably obtained by mixing the ethylene/tetrafluoroethylene copolymer and the polyolefin such that the wt % ratio of the ethylene/tetrafluoroethylene copolymer to the polyolefin is 0.0005 to 1 wt %.

The molded article of the present invention can be formed to have any of various shapes such as a sheet shape; a film shape; a rod shape; a pipe shape; and a fibrous shape.

The application of the molded article is not particularly limited, and depends on the species of the polyolefin used. For example, the molded article is suitable for products which are mainly required to have dynamic properties such as mechanical properties, and the surface properties.

Examples of the application of the molded article include various films, bags, covering materials, tableware such as beverage containers, electric wires, cables, pipes, fibers, bottles, gasoline tanks, and any other various industrial molded articles.

Advantageous Effects of Invention

The processing aid for polyolefins of the present invention having the above composition can eliminate melt fracture occurring at the start of molding in a short time even when a polyolefin, which is a melt-processable polymer, is extrusion-molded at a high speed, and the processing aid, when simply added in a small amount to the polyolefin, enables elimination of melt fracture in a time equivalent to those of conventional technologies.

DESCRIPTION OF EMBODIMENTS

Figure 1:
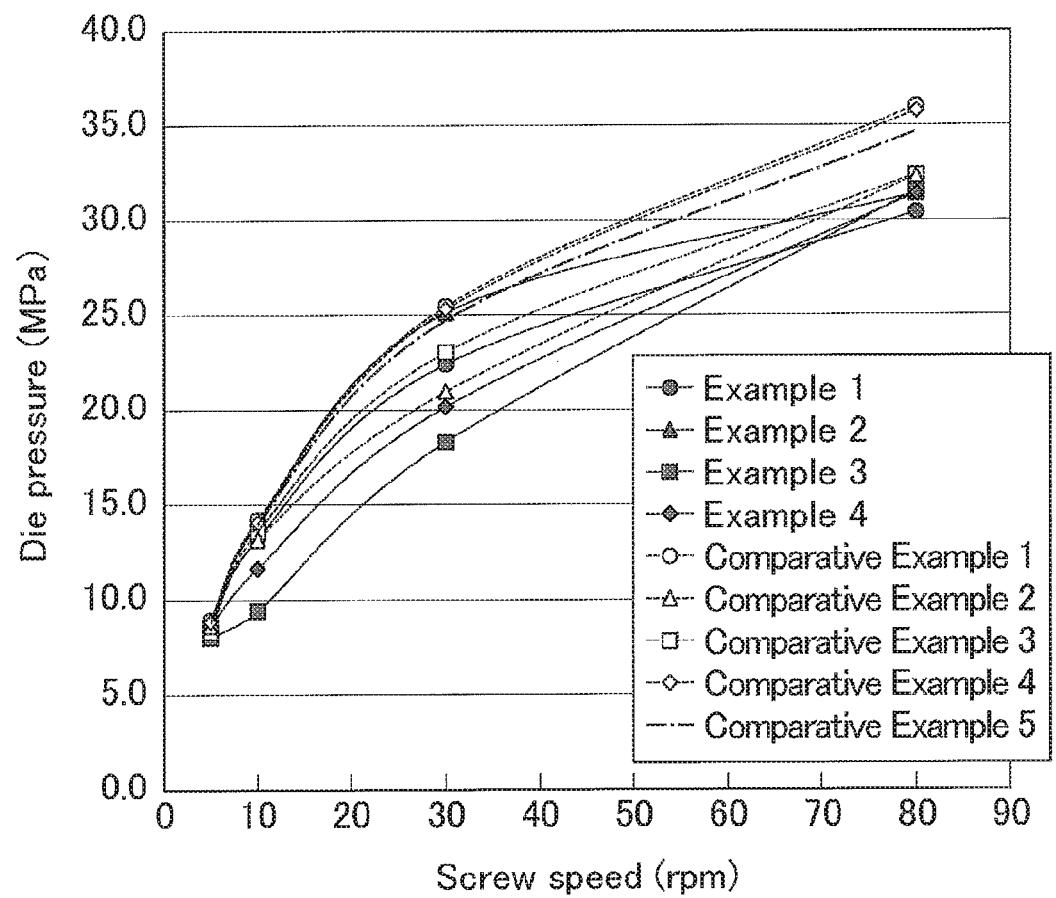
FIG. 1 is a graph showing the relation between the screw speed (shear rate) and the die pressure in each of Examples 1 to 4 and Comparative Examples 1 to 5.

The present invention is described in more detail below with reference to examples and comparative examples. These examples, however, are not intended to limit the scope of the present invention.

The measured values in the examples and comparative examples below were determined by the following methods.
1. Copolymer Composition This value was determined using $^{19}$F-NMR (AC300P from Bruker Corporation).
2. Melt Flow Rate [MFR]

This value was determined in accordance with ASTM D 3159.

3. Melting Point [mp]

A temperature at the local maximum on a melting curve obtained by raising the temperature at a rate of 10° C./min with a DSC device (from Seiko Instruments Inc.) was set to the melting point.

4. Melt Fracture Elimination Time

A polyolefin alone with melt fracture on the entire surface was extruded until the pressure became stable. Thereafter, materials (e.g. processing aid) for each composition were fed to a hopper when the screws became visible. The time from the feeding (set to 0) to the time when the melt fracture was eliminated and the entire surface of the molded article became smooth was taken as the melt fracture elimination time. Elimination of melt fracture was examined visually and by touch.

As a result of visual examination and examination by touch, a surface that was found to be wavy entirely or partly to give a strip pattern, not a glossy, smooth surface from which melt fracture was eliminated entirely, is referred to as a "rough skin" herein.

5. Amount of Pressure Drop, Time to Reach Stable Pressure

In the later-described extrusion evaluation, the extrusion pressure in the initial stage is a pressure (initial pressure) only from the linear low density polyethylene without a processing aid, which is decreased by the effect of the processing aid and then becomes stable at a certain level (stable pressure). The difference between the initial pressure and the stable pressure is referred to as the amount of pressure drop. Also, the time for the pressure to reach the stable pressure is referred to as the time to reach stable pressure.

(Production of Processing Aid)

The fluoropolymers used in Examples 1 to 4 were produced with the respective compositions shown in Table 1 by substantially the same procedure as the polymerization in the comparative examples in JP 3428026 B. In Examples 1 to 4, these produced fluoropolymers were used as processing aids.

The fluoropolymers used in Comparative Examples 2 and 3 were produced with the respective compositions shown in Table 1 by substantially the same procedure as the polymerization in the examples in JP 5140902 B.

The produced fluoropolymer was used as a processing aid in Comparative Example 2. In Comparative Example 3, a mixture of the produced fluoropolymer and a polyethylene glycol (CARBOWAX™ SENTRY™ POLYETHYLENE GRYCOL 8000 GRANULAR NF from The Dow Chemical Company, hereinafter referred to as "PEG") in an amount of ½ of the fluoropolymer was used as a processing aid.

The fluoropolymer used in Comparative Example 4 was produced with the composition shown in Table 1 by substantially the same procedure as polymerization in the examples in U.S. Pat. No. 3,085,083. In Comparative Example 4, the produced fluoropolymer was used as a processing aid.

The fluoropolymer used in Comparative Example 5 was produced with the composition shown in Table 1 by substantially the same procedure as polymerization in the examples in JP 3428026 B. In Comparative Example 5, the produced fluoropolymer was used as a processing aid.

The fluoropolymers used in Examples 10 to 12 were produced with the respective compositions and MFRs shown in Table 4 by substantially the same procedure as the respective production procedures for the fluoropolymers used in Examples 1 to 3. In Examples 10 to 12, the produced fluoropolymers were used as processing aids.

(Production of Masterbatch)

A linear low density polyethylene (LLDPE 1002YB from Exxon Mobil Corporation) was mixed with one of the above processing aids such that the processing aid constituted 5 wt % of the total weight of the linear low density polyethylene and the processing aid. The mixture was further mixed with 0.1 wt % IRGANOX B225 (from BASF SE). The mixture was supplied to a twin-screw extruder (LABO PLASTO-MILL 30C150 from Toyo Seiki Seisaku-sho, Ltd., screw L/D) so that pellets containing the processing aid were produced at a screw speed of 80 rpm. A processing aid-containing masterbatch made of a processing aid and a polyolefin was obtained under the same conditions as those for obtaining the pellets, except that the obtained pellets containing the processing aid was mixed by tumbling and the screw speed was set to 100 rpm in order to improve the dispersion homogeneity of the processing aid in the masterbatch.

The following shows the temperature conditions in extrusion.

Condition 1: cylinder temperatures 150° C., 250° C., and 250° C., die temperature 180° C.

Condition 2: cylinder temperatures 150° C., 170° C., and 180° C., die temperature 180° C.

Ultrathin pieces were cut out from the pellets obtained under Conditions 1 and 2, and subjected to microscopic observations with a reflection-type optical microscope. The obtained images were each binarized with an optical analyzer. As a result, the pellets obtained under Conditions 1 and 2 were each found to contain the processing aid dispersed as fine particles in the linear low density polyethylene. From each binarized image, the average dispersed particle size was determined. The pellets obtained under both Conditions 1 and 2 were each found to have an average dispersed particle size of 5 μm or smaller, but many of the pellets obtained under Conditions 2 contained processing aid particles with a particle size of 10 μm or larger.

Extrusion Evaluation 1

Comparative Example 1

A linear low density polyethylene (LLDPE 1201XV from Exxon Mobil Corporation) was extruded by a single-screw extruder (Rheomex OS from Haake Technik GmbH, L/D: 33, screw diameter: 20 mm, die diameter: 2 mmϕ×40 mmL) with a cylinder temperature of 210° C. to 240° C., a die temperature of 240° C., and a screw speed of 30 rpm. Changes in the die pressure were observed for 60 minutes. Thereafter, changes in the die pressure were observed at a screw speed of 10 rpm for 10 minutes, at 80 rpm for 15 minutes, and at 5 rpm for 120 minutes.

Examples 1 to 4 and Comparative Examples 2 to 5

The extrusion evaluation was performed in the same manner as in Comparative Example 1, except that a processing aid-containing masterbatch molded by the above twin-screw extruder under Condition 1 was added to the above linear low density polyethylene (LLDPE 1201XV from Exxon Mobil Corporation) such that the masterbatch constituted 1 wt % of the total weight of the linear low density polyethylene and the masterbatch, and the components were mixed by tumbling.

Before each examination operation, 15 wt % silica-containing linear low density polyethylene was fed to a hopper, the screw speed was increased to 150 rpm, and the extruder was purged for about 15 minutes. The same linear low density polyethylene as that to be used in the examination (LLDPE 1201XV from Exxon Mobil Corporation) was fed, and the extruder was purged for about 15 minutes. The screw speed was then decreased back to 30 rpm, and the mixture was extruded until the temperature became stable. After the pressure was confirmed to be back to the initial pressure of 25.3 to 25.9 MPa, the subsequent experiment was performed. In the case that the pressure was not back to the initial pressure, the subsequent experiment was performed after the above purging was repeated until the pressure was back to the initial pressure.

The compositions of the fluoropolymers and evaluation results in Examples 1 to 4 and Comparative Examples 1 to 5 are shown in Table 1 and FIG. 1.

(LLDPE 1201XV from Exxon Mobil Corporation) such that the masterbatch constituted 1 wt % of the total weight of the linear low density polyethylene and the masterbatch, and they were mixed by tumbling. The obtained masterbatch-containing linear low density polyethylene was extruded by a single-screw extruder (Rheomex OS from Haake Technik GmbH, L/D: 33, screw diameter: 20 mm, die diameter: 2 mm$\phi$×40 mmL) with a cylinder temperature of 210° C. to 240° C., a die temperature of 240° C., and a screw speed of 80 rpm. Changes in the die pressure and melt fracture were observed.

Examples 6 to 8

The extrusion evaluation was performed in the same manner as in Example 5, except that the processing aid-

TABLE 1

| | Processing aid | mp (° C.) | MFR (g/10 min) | Fluoropolymer composition (mol %) | | | | | | Die pressure (MPa) | | | |
| | | | | TFE | Ethylene | VDF | HFP | Fluoromonomer I | Fluoromonomer II | 30 rpm | 10 rpm | 80 rpm | 5 rpm |
|---|---|---|---|---|---|---|---|---|---|---|---|---|---|
| Example 1 | ETFE 1 | 219 | 24 | 64.5 | 33 | 0 | 0 | 2.4 | 0 | 22.6 | 13.2 | 30.2 | 8.6 |
| Example 2 | ETFE 2 | 220 | 45 | 64.3 | 33.2 | 0 | 0 | 2.4 | 0 | 25.1 | 14.1 | 31.4 | 8.8 |
| Example 3 | ETFE 3 | 216 | 1.1 | 64.4 | 32.9 | 0 | 0 | 2.7 | 0 | 18.3 | 9.4 | 31.5 | 8.0 |
| Example 4 | ETFE 4 | 216 | 26 | 56.4 | 39.9 | 0 | 0 | 0 | 3.7 | 20.2 | 11.6 | 31.4 | 8.6 |
| Comparative Example 1 | Not added | — | — | — | — | — | — | — | — | 25.5 | 14.2 | 36.0 | 8.9 |
| Comparative Example 2 | Fluororubber | — | — | 0 | 0 | 78 | 22 | 0 | 0 | 21.0 | 13.2 | 32.3 | 8.6 |
| Comparative Example 3 | Fluororubber + PEG | — | — | 0 | 0 | 78 | 22 | 0 | 0 | 23.0 | 13.6 | 32.4 | 8.3 |
| Comparative Example 4 | FEP | 210 | 13 | 87.3 | 0 | 0 | 12.7 | 0 | 0 | 25.3 | 14.1 | 35.8 | 8.8 |
| Comparative Example 5 | ETFE 5 | 159 | 34 | 40.7 | 44.6 | 0 | 14.1 | 0.6 | 0 | 24.7 | 14.0 | 34.7 | 8.8 |

The terms in Table 1 refer to the following compounds.
TFE: tetrafluoroethylene
VDF: vinylidene fluoride
HFP: hexafluoropropylene
Fluoromonomer I: $CH_2=CFCF_2CF_2CF_2H$
Fluoromonomer II: $CH_2=CHCF_2CF_2CF_2CF_3$ As shown in Table 1, when the processing aid of the present invention was used, the pressure drop at 80 rpm was greater than those in Comparative Examples 2 to 4.

The shear rates calculated from the following equation are shown in Table 2.

$$\gamma = \frac{4Q}{\pi R^3} \qquad [\text{Eq. 1}]$$

The symbols in the above equation refer to the following.
γ: shear rate (sec$^{-1}$)
Q: extrusion amount (kg/hr)
R: die diameter (mm)

TABLE 2

| Screw speed | rpm | 30 | 10 | 80 | 5 |
|---|---|---|---|---|---|
| Shear rate | sec$^{-1}$ | 440 | 130 | 1200 | 60 |

Extrusion Evaluation 2

Example 5

The processing aid-containing masterbatch used in Example 1 was added to the linear low density polyethylene containing masterbatch used in Example 1 was added such that the masterbatch constituted 0.2, 0.1, or 0.05 wt % of the total weight of the linear low density polyethylene and the masterbatch.

Comparative Example 6

The extrusion evaluation was performed in the same manner as in Example 5, except that the processing aid-containing masterbatch used in Comparative Example 2 was used.

Comparative Example 7

The extrusion evaluation was performed in the same manner as in Example 5, except that the processing aid-containing masterbatch used in Comparative Example 3 was used.

Before each examination operation, 15 wt % silica-containing linear low density polyethylene was fed to a hopper, the screw speed was increased to 150 rpm, and the extruder was purged for about 15 minutes. The same linear low density polyethylene as that to be used in the examination (LLDPE 1201XV from Exxon Mobil Corporation) was fed, and the extruder was purged for about 15 minutes. The screw speed was then decreased back to 80 rpm, and the mixture was extruded until the temperature became stable. After the pressure was confirmed to be back to the initial pressure of 35.6 to 35.8 MPa, the subsequent experiment was performed. In the case that the pressure was not back to the initial pressure, the subsequent experiment was performed after the above purging was repeated until the pressure was back to the initial pressure.

Figure 2:
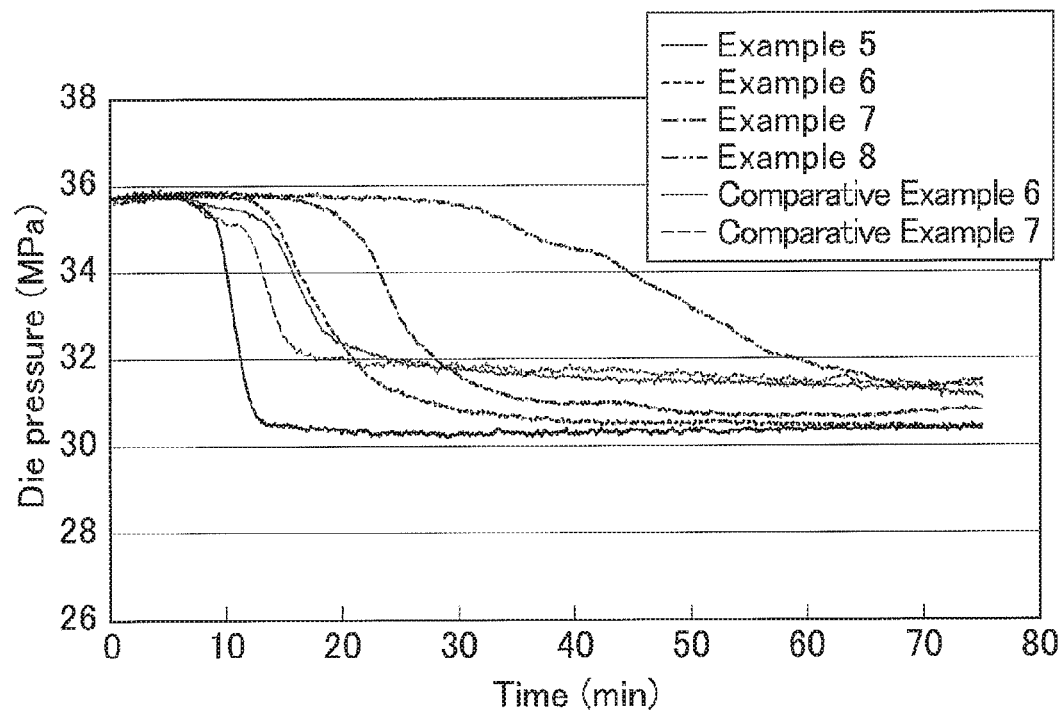
FIG. 2 is a graph showing changes in the die pressure with time during extrusion in each of Examples 5 to 8 and Comparative Examples 6 and 7.

Evaluation results in Examples 5 to 8 and Comparative Examples 6 and 7 are shown in Table 3. Changes in the die pressure with time in extrusion in each of Examples 5 to 8 and Comparative Examples 6 and 7 are shown in FIG. 2.

containing masterbatch used in Example 4 was used, the cylinder temperature was 180° C. to 220° C., and the die temperature was 220° C.

TABLE 3

| | Processing aid | mp (° C.) | MFR (g/10 min) | Concentration of processing aid added (ppm) | Amount of pressure drop (ΔP) (MPa) | Time to reach stable pressure (min) | Examined appearance of extruded product |
|---|---|---|---|---|---|---|---|
| Example 5 | ETFE 1 | 219 | 24 | 500 | 5.3 | 20 | Melt fracture was eliminated |
| Example 8 | ETFE 1 | 219 | 24 | 100 | 5.3 | 40 | Melt fracture was eliminated |
| Example 7 | ETFE 1 | 219 | 24 | 50 | 4.9 | 50 | Melt fracture was eliminated |
| Example 8 | ETFE 1 | 219 | 24 | 25 | 3.9 | 70 | Melt fracture was eliminated |
| Comparative Example 6 | Fluororubber | — | — | 500 | 4.6 | 70 or longer | Rough skin |
| Comparative Example 7 | Fluororubber + PEG | — | — | 500 | 4.4 | 70 or longer | Rough skin |

In Table 3, the concentration of processing aid added (ppm) is the proportion of the processing aid based on the total weight of the linear low density polyethylene and the masterbatch.

Table 3 and FIG. 2 show the following points. In Example 5, the pressure dropped by 5 MPa in 15 minutes from the start of the addition of the masterbatch, and the melt fracture was completely eliminated. The results of Examples 6 to 8 show that the time required for the pressure to drop became longer as the concentration of the processing aid added decreased, but the melt fracture was completely eliminated in 70 minutes from the addition even when the addition concentration was 25 ppm. In the cases of Comparative Examples 6 and 7, the pressure drop (amount of pressure drop ΔP) was smaller and the time to completion of the dropping (time to reach stable pressure) was longer than the respective values in Example 5. Also, even after 70 minutes from the start of the addition of the masterbatch, the melt fracture was not eliminated completely.

Extrusion Evaluation 3

Example 9

The extrusion evaluation was performed in the same manner as in Example 5, except that the processing aid- Examples 10 to 12

The extrusion evaluation was performed in the same manner as in Example 9, except that the processing aid-containing masterbatch molded by the twin-screw extruder under Condition 1 was used.

Comparative Example 8

The extrusion evaluation was performed in the same manner as in Example 9, except that the processing aid-containing masterbatch used in Comparative Example 2 was used.

Comparative Example 9

The extrusion evaluation was performed in the same manner as in Example 9, except that the processing aid-containing masterbatch used in Comparative Example 3 was used.

Figure 3:
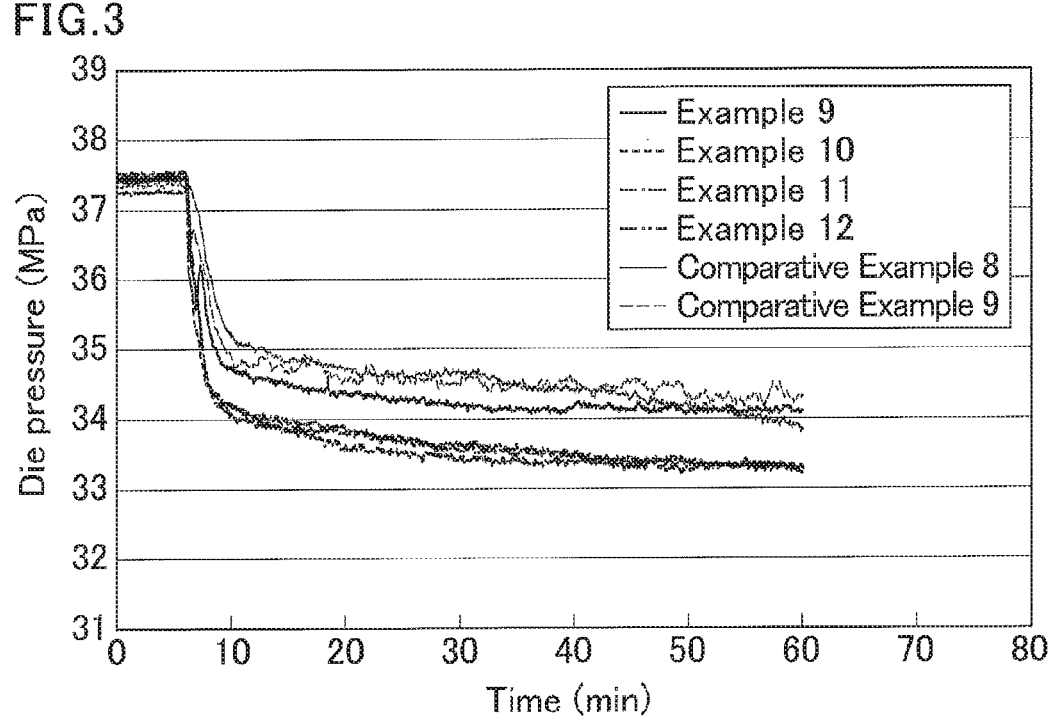
FIG. 3 is a graph showing changes in the die pressure with time during extrusion in each of Examples 9 to 12 and Comparative Examples 8 and 9.

Evaluation results in Examples 9 to 12 and Comparative Examples 8 and 9 are shown in Table 4. Changes in the die pressure with time in each of Examples 9 to 12 and Comparative Examples 8 and 9 are shown in FIG. 3.

TABLE 4

| | | Fluoropolymer composition (mol %) | | | | | |
|---|---|---|---|---|---|---|---|
| | Processing aid | TFE | Ethylene | Fluoromonomer I | Fluoromonomer II | mp (° C.) | MFR (g/10 min) |
| Example 9 | ETFE 4 | 56.4 | 39.9 | 0 | 3.7 | 216 | 26 |
| Example 10 | ETFE 6 | 64.4 | 33.1 | 2.4 | 0 | 219 | 8.7 |
| Example 11 | ETFE 7 | 64.3 | 33.2 | 2.4 | 0 | 220 | 25 |
| Example 12 | ETFE 8 | 64.4 | 32.9 | 2.4 | 0 | 220 | 37 |
| Comparative Example 8 | Fluororubber | Same as in Comparative Example 2 | | | | — | — |
| Comparative Example 9 | Fluororubber + PEG | Same as in Comparative Example 3 | | | | — | — |

| | Concentration of processing aid added (ppm) | Amount of pressure drop (ΔP) (MPa) | Time to reach stable pressure (min) | Appearance of extruded product after 60 minutes |
|---|---|---|---|---|
| Example 9 | 500 | 3.4 | 40 | Melt fracture was eliminated |
| Example 10 | 500 | 4.2 | 40 | Melt fracture was eliminated |
| Example 11 | 500 | 4.0 | 40 | Melt fracture was eliminated |
| Example 12 | 500 | 4.2 | 40 | Melt fracture was eliminated |

TABLE 4-continued

| | | | | |
|---|---|---|---|---|
| Comparative Example 8 | 500 | 3.6 | 60 or longer | Rough skin |
| Comparative Example 9 | 500 | 3.0 | 60 or longer | Rough skin |

Table 4 and FIG. 3 show the following points. In each of Examples 9 to 12, melt fracture was eliminated completely. In the cases of Comparative Examples 8 and 9, the pressure drop (amount of pressure drop ΔP) was smaller and the time to completion of the dropping (time to reach stable pressure) was longer than the respective values in Examples 10 to 12. Also, the melt fracture was not eliminated completely even after 60 minutes from the start of the addition of the masterbatch.

Extrusion Evaluation 4

Examples 13 to 16 and Comparative Examples 10 and 11

The extrusion evaluation was performed in the same manner as in Examples 9 to 12 and Comparative Examples 8 and 9, respectively, except that a linear low density polyethylene (LLDPE 1004YB from Exxon Mobil Corporation, MI=4) was used.

Figure 4:
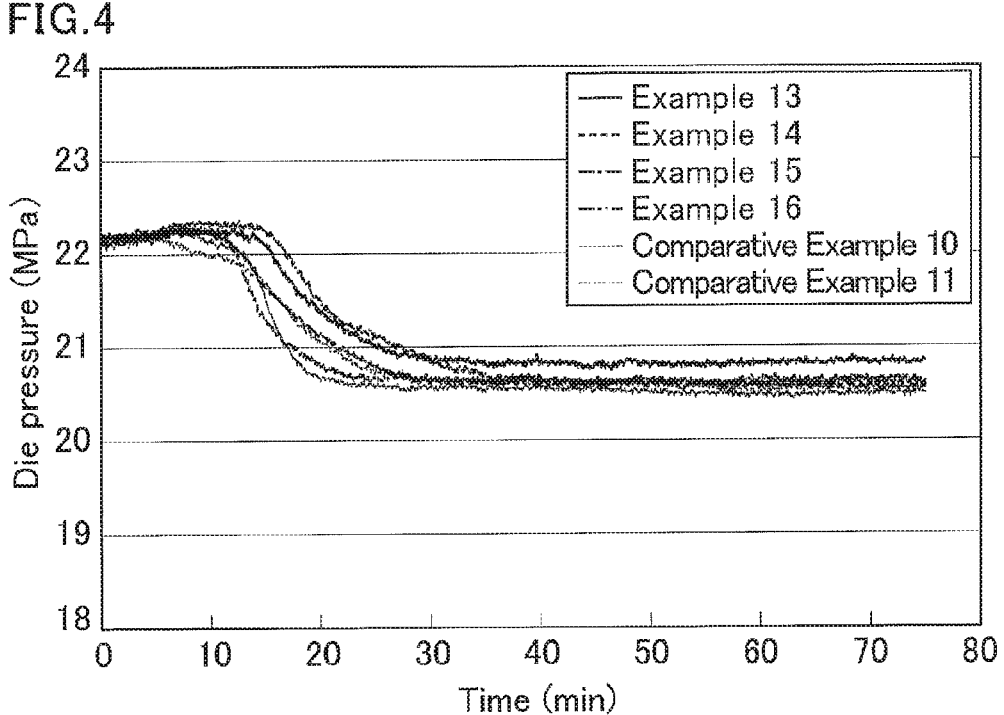
FIG. 4 is a graph showing changes in the die pressure with time during extrusion in each of Examples 13 to 16 and Comparative Examples 10 and 11.

Evaluation results in Examples 13 to 16 and Comparative Examples 10 and 11 are shown in Table 5. Changes in the die pressure with time in extrusion in each of Examples 13 to 16 and Comparative Examples 10 and 11 are shown in FIG. 4.

In each of Examples 42 and 43, a pre-mixture of the fluoropolymer ETFE 7 and a PEG mixed at a weight ratio of 20/80 or 50/50 was used as a processing aid.

The PEG used was CARBOWAX™ SENTRY™ POLYETHYLENE GRYCOL 8000 GRANULAR from The Dow Chemical Company.

The fluoropolymers (fluororubbers) used in Comparative Examples 13, 17, 19, and 21 were produced with the respective compositions shown in Table 1 by substantially the same procedure as polymerization in the examples in JP 5140902 B.

In each of Comparative Examples 13, 17, 19, and 21, a mixture of the produced fluoropolymer and an anti-blocking agent mixed at a weight ratio of fluororubber/anti-blocking agent of 90/10 was used as a processing aid.

The anti-blocking agent used was a pre-mixture of talc (Jetfine 1A from Luzenac), silica (SYLOBLOC 45H from W. R. Grace & Co.), and calcium carbonate (Brilliant 1500 from Shiraishi Kogyo Kaisha, Ltd.) mixed at a weight ratio of 3/6/2.

In each of Comparative Examples 14, 18, 20, and 22, a mixture of the same fluoropolymer (fluororubber) as described above and a polyethylene glycol (PEG) mixed at a weight ratio of fluororubber/PEG of 1/2 was used as a processing aid.

TABLE 5

| | Processing aid | Fluoropolymer composition (mol %) | | | | mp (° C.) | MFR (g/10 min) | Concentration of processing aid added (ppm) | Amount of pressure drop (ΔP) (MPa) | Time to reach stable pressure (min) | Melt fracture elimination time (min) |
|---|---|---|---|---|---|---|---|---|---|---|---|
| | | TFE | Ethylene | Fluoromonomer I | Fluoromonomer II | | | | | | |
| Example 13 | ETFE 4 | 56.4 | 39.9 | 0 | 3.7 | 216 | 26 | 500 | 1.4 | 35 | 20 |
| Example 14 | ETFE 6 | 64.4 | 33.1 | 2.4 | 0 | 219 | 8.7 | 500 | 1.6 | 20 | 10 |
| Example 15 | ETFE 7 | 64.3 | 33.2 | 2.4 | 0 | 220 | 25 | 500 | 1.6 | 25 | 20 |
| Example 16 | ETFE 8 | 64.4 | 32.9 | 2.4 | 0 | 220 | 37 | 500 | 1.6 | 40 | 20 |
| Comparative Example 10 | Fluororubber | Same as in Comparative Example 2 | | | | — | — | 500 | 1.6 | 30 | 30 |
| Comparative Example 11 | Fluororubber + PEG | Same as in Comparative Example 3 | | | | — | — | 500 | 1.6 | 40 | 40 |

Table 5 and FIG. 4 show the following points. The results of Examples 14 to 16 show that the time to melt fracture elimination became longer as the MFR increased, but the melt fracture was completely eliminated in 20 minutes in each case. In the cases of Comparative Examples 10 and 11, the pressure dropped in a short time, but the time to melt fracture elimination was 30 to 40 minutes.

(Production of Processing Aid)

Fluoropolymers used in Examples 17 to 45, namely ETFEs 9 to 18, were produced by substantially the same procedure as the polymerization in the examples and comparative examples in JP 5445583 B.

In Examples 17 to 34, 44, and 45, the produced fluoropolymers were used as processing aids.

In Examples 35 to 43, a mixture of the fluoropolymer ETFE 7 and a polyethylene glycol (PEG) was used as a processing aid.

The PEG used was CARBOWAX™ SENTRY™ POLYETHYLENE GRYCOL 8000 GRANULAR from The Dow Chemical Company.

The fluoropolymer used in Comparative Example 15 was produced with the composition shown in Table 1 by substantially the same procedure as polymerization in the examples in U.S. Pat. No. 3,085,083. In Comparative Example 15, the produced fluoropolymer was used as a processing aid.

The fluoropolymer used in Comparative Example 16 was produced with the composition shown in Table 1 by substantially the same procedure as polymerization in the examples in JP 3428026 B. In Comparative Example 16, the produced fluoropolymer was used as a processing aid.

(Production of Masterbatch)

A linear low density polyethylene (LLDPE 1002YB from Exxon Mobil Corporation) was mixed with one of the above processing aids such that the processing aid constituted 5 wt % of the total weight of the linear low density polyethylene and the processing aid. The mixture was further mixed with 0.1 wt % IRGANOX B225 (from BASF SE). The mixture was supplied to a twin-screw extruder (LABO PLASTO-MILL 30C150 from Toyo Seiki Seisaku-sho, Ltd., screw L/D: 25) so that pellets containing the processing aid were produced at a screw speed of 80 rpm. A processing aid-containing masterbatch made of a processing aid and a polyolefin was obtained under the same conditions as those for obtaining the pellets, except that the obtained pellets containing the processing aid was mixed by tumbling and the screw speed was set to 100 rpm in order to improve the dispersion homogeneity of the processing aid in the masterbatch.

The following shows the temperature conditions in extrusion.

Condition 1: cylinder temperatures 150° C., 250° C., and 250° C., die temperature 180° C.

Ultrathin pieces were cut out from the pellets obtained, and subjected to microscopic observations with a reflection-type optical microscope. The obtained images were binarized with an optical analyzer. As a result, the pellets obtained were each found to contain the processing aid dispersed as fine particles in the linear low density polyethylene. From each binarized image, the average dispersed particle size was determined. The pellets obtained were each found to have an average dispersed particle size of 5 μm or smaller.

Extrusion Evaluation 5

Examples 17 to 26

A linear low density polyethylene (LLDPE 1201XV from Exxon Mobil Corporation) was mixed with the processing aid (one of ETFEs 9 to 18)-containing masterbatch molded by the above twin-screw extruder such that the masterbatch constituted 1 wt % of the total weight of the linear low density polyethylene and the masterbatch, and they were mixed by tumbling. The mixture was extruded by a single-screw extruder (Rheomex OS from Haake Technik GmbH, L/D: 33, screw diameter: 20 mm, die diameter: 2 mmϕ×40 mmL) with a cylinder temperature of 210° C. to 240° C., a die temperature of 240° C., and a screw speed of 30 rpm. Changes in the die pressure were observed for 60 minutes. Thereafter, changes in the die pressure were observed at a screw speed of 10 rpm for 10 minutes, at 80 rpm for 15 minutes, and at 5 rpm for 120 minutes.

Comparative Example 12

The extrusion evaluation was performed in the same manner as in Examples 17 to 26, except that the linear low density polyethylene (LLDPE 1201XV from Exxon Mobil Corporation) alone was extruded by a single-screw extruder.

Comparative Examples 13 to 16

The extrusion evaluation was performed in the same manner as in Comparative Example 1, except that the processing aid (listed in Table 7)-containing masterbatch molded by the twin-screw extruder was added to the above linear low density polyethylene (LLDPE 1201XV from Exxon Mobil Corporation) such that the masterbatch constituted 1 wt % of the total weight of the linear low density polyethylene and the masterbatch, and they were mixed by tumbling.

Before each examination operation, 15 wt % silica-containing linear low density polyethylene was fed to a hopper, the screw speed was increased to 150 rpm, and the extruder was purged for about 15 minutes. The same linear low density polyethylene as that to be used in the examination (LLDPE 1201XV from Exxon Mobil Corporation) was fed, and the extruder was purged for about 15 minutes. The screw speed was then decreased back to 30 rpm, and the mixture was extruded until the temperature became stable. After the pressure was confirmed to be back to the initial pressure of 25.3 to 25.9 MPa, the subsequent experiment was performed. In the case that the pressure was not back to the initial pressure, the subsequent experiment was performed after the above purging was repeated until the pressure was back to the initial pressure.

Figure 5:
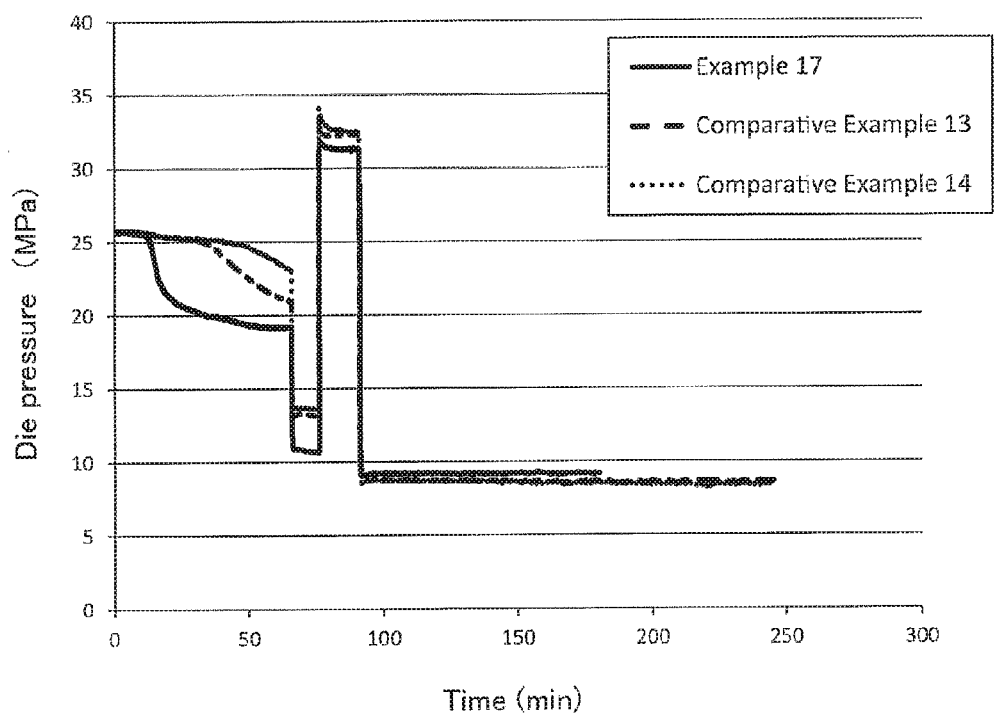
FIG. 5 is a graph showing changes in the die pressure with time during extrusion in each of Example 17 and Comparative Examples 13 and 14.

The compositions of the fluoropolymers and evaluation results in Examples 17 to 26 and Comparative Examples 12 to 16 are shown in Tables 6 and 7. Changes in the die pressure with time in extrusion in each of Example 17 and Comparative Examples 13 and 14 are shown in FIG. 5.

TABLE 6

| Fluoropolymer | mp (° C.) | MFR (g/10 min) | Fluoropolymer composition (mol %) | | | | |
|---|---|---|---|---|---|---|---|
| | | | TFE | Ethylene | Fluoromonomer I | Fluoromonomer II | Fluoromonomer III |
| ETFE 9 | 225 | 0.21 | 59.8 | 38.2 | 0.0 | 0.0 | 2.0 |
| ETFE 10 | 218 | 2 | 64.0 | 33.9 | 0.0 | 0.0 | 2.0 |
| ETFE 11 | 217 | 9.3 | 63.5 | 34.2 | 0.0 | 0.0 | 2.3 |
| ETFE 12 | 218 | 16 | 63.6 | 34.2 | 0.0 | 0.0 | 2.2 |
| ETFE 13 | 222 | 71 | 63.6 | 34.3 | 0.0 | 0.0 | 2.1 |
| ETFE 14 | 198 | 6 | 61.3 | 34.7 | 0.0 | 0.0 | 4.0 |
| ETFE 15 | 200 | 15 | 61.3 | 34.7 | 0.0 | 0.0 | 4.0 |
| ETFE 16 | 199 | 2.3 | 73.6 | 22.4 | 0.0 | 0.0 | 4.0 |
| ETFE 17 | 220 | 10 | 63.5 | 34.5 | 0.0 | 2.0 | 0.0 |
| ETFE 18 | 201 | 35 | 60.7 | 35.2 | 0.0 | 4.1 | 0.0 |

The terms in Table 6 refer to the following compounds.
TFE: tetrafluoroethylene
Fluoromonomer I: $CH_2=CFCF_2CF_2CF_2H$
Fluoromonomer II: $CH_2=CHCF_2CF_2CF_2CF_3$
Fluoromonomer III: $CH_2=CHCF_2CF_2CF_2CF_2CF_3$

TABLE 7

| | | Die pressure (MPa) | | | |
|---|---|---|---|---|---|
| | Processing aid | 30 rpm | 10 rpm | 80 rpm | 5 rpm |
| Example 17 | ETFE 9 | 19.2 | 10.6 | 31.3 | 9.1 |
| Example 18 | ETFE 10 | 17.5 | 9.7 | 29.7 | 9.3 |
| Example 19 | ETFE 11 | 25.4 | 14.2 | 29.8 | 9.1 |

TABLE 7-continued

| | Processing aid | Die pressure (MPa) | | | |
|---|---|---|---|---|---|
| | | 30 rpm | 10 rpm | 80 rpm | 5 rpm |
| Example 20 | ETFE 12 | 24.9 | 14.3 | 30.6 | 8.9 |
| Example 21 | ETFE 13 | 25.0 | 14.4 | 30.4 | 9.3 |
| Example 22 | ETFE 14 | 21.6 | 14.1 | 30.3 | 9.3 |
| Example 23 | ETFE 15 | 25.5 | 14.5 | 30.5 | 9.3 |
| Example 24 | ETFE 16 | 25.4 | 14.4 | 25.5 | 9.2 |
| Example 25 | ETFE 17 | 25.4 | 14.5 | 29.3 | 9.2 |
| Example 26 | ETFE 18 | 25.5 | 14.4 | 31.3 | 9.2 |
| Comparative Example 12 | Not added | 25.5 | 14.2 | 36.0 | 8.9 |
| Comparative Example 13 | Fluororubber + anti-blocking agent | 21.0 | 13.2 | 32.3 | 8.6 |
| Comparative Example 14 | Fluororubber + PEG | 23.0 | 13.6 | 32.4 | 8.3 |
| Comparative Example 15 | FEP | 25.3 | 14.1 | 35.8 | 8.8 |
| Comparative Example 16 | EFEP | 24.7 | 14.0 | 34.7 | 8.8 |

As shown in Table 7, each case in which one of the processing aids of the present invention was used demonstrated a lower die pressure at 80 rpm than Comparative Examples 12 to 16.

Extrusion Evaluation 6

Examples 27 to 34

A linear low density polyethylene (LLDPE 1201XV from Exxon Mobil Corporation) was mixed with one of the processing aid-containing masterbatches used in Examples 17, 18, 20, and 22 to 26 such that the masterbatch constituted 1 wt % of the total weight of the linear low density polyethylene and the masterbatch, and they were mixed by tumbling. The obtained masterbatch-containing linear low density polyethylene was extruded by a single-screw extruder (Rheomex OS from Haake Technik GmbH, L/D: 33, screw diameter: 20 mm, die diameter: 2 mmφ×40 mmL) with a cylinder temperature of 210° C. to 240° C., a die temperature of 240° C., and a screw speed of 80 rpm. Changes in the die pressure and melt fracture were observed.

Before each examination operation, 15 wt % silica-containing linear low density polyethylene was fed to a hopper, the screw speed was increased to 150 rpm, and the extruder was purged for about 15 minutes. The same linear low density polyethylene as that to be used in the examination (LLDPE 1201XV from Exxon Mobil Corporation) was fed, and the extruder was purged for about 15 minutes. The screw speed was then decreased back to 80 rpm, and the mixture was extruded until the temperature became stable. After the pressure was confirmed to be back to the initial pressure of 35.5 to 36.3 MPa, the subsequent experiment was performed. In the case that the pressure was not back to the initial pressure, the subsequent experiment was performed after the above purging was repeated until the pressure was back to the initial pressure.

The shear rate calculated from the equation of Eq. 1 was about 1,200 sec$^{-1}$.

Comparative Example 17

The extrusion evaluation was performed in the same manner as in Example 27, except that the processing aid-containing masterbatch used in Comparative Example 13 was used.

Comparative Example 18

The extrusion evaluation was performed in the same manner as in Example 27, except that the processing aid-containing masterbatch used in Comparative Example 14 was used.

Figure 6:
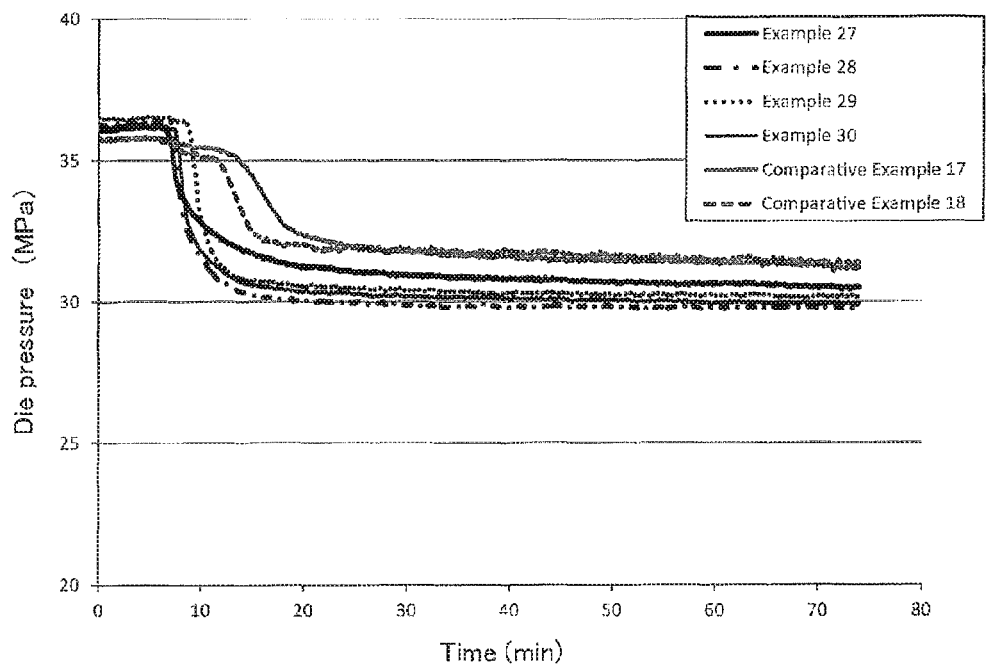
FIG. 6 is a graph showing changes in the die pressure with time during extrusion in each of Examples 27 to 30 and Comparative Examples 17 and 18.

Evaluation results in Examples 27 to 34 and Comparative Examples 17 and 18 are shown in Table 8. Changes in the die pressure with time in extrusion in each of Examples 27 to 30 and Comparative Examples 17 and 18 are shown in FIG. 6.

Figure 7:
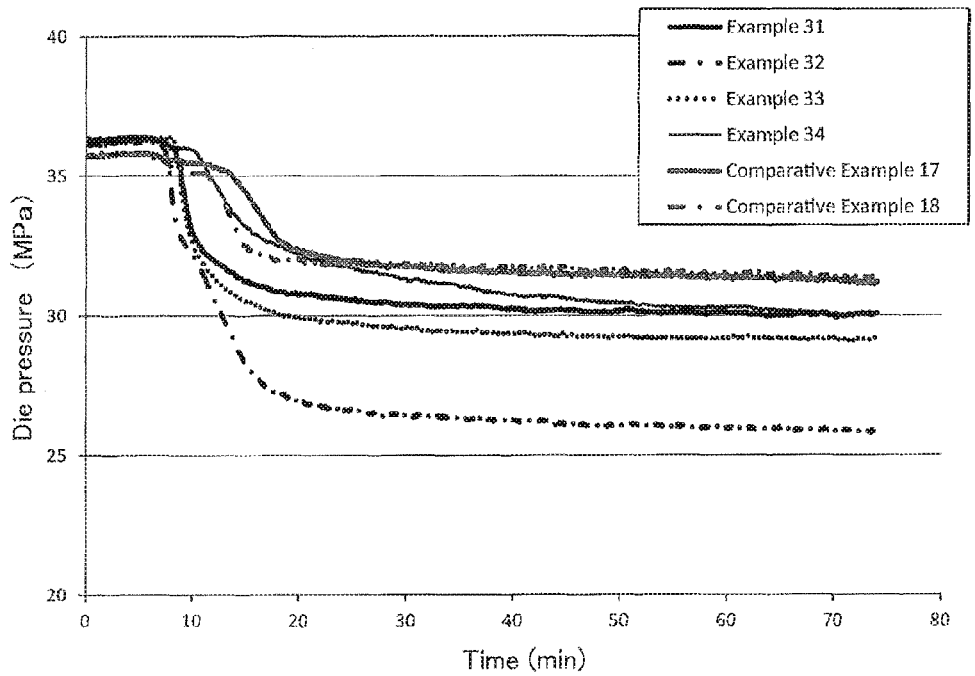
FIG. 7 is a graph showing changes in the die pressure with time during extrusion in each of Examples 31 to 34 and Comparative Examples 17 and 18.

Also, changes in the die pressure with time in extrusion in each of Examples 31 to 34 and Comparative Examples 17 and 18 are shown in FIG. 7.

TABLE 8

| | Processing aid | Amount of pressure drop (ΔP) (MPa) | Melt fracture elimination time (min) | Examined appearance of extruded product |
|---|---|---|---|---|
| Example 27 | ETFE 9 | 5.7 | 10 | Glossy |
| Example 28 | ETFE 10 | 6.7 | 10 | Glossy |
| Example 29 | ETFE 12 | 6.4 | 10 | Glossy |
| Example 30 | ETFE 14 | 6.4 | 10 | Glossy |
| Example 31 | ETFE 15 | 6.4 | 10 | Glossy |
| Example 32 | ETFE 16 | 10.5 | 10 | Glossy |
| Example 33 | ETFE 17 | 7.1 | 20 | Glossy |
| Example 34 | ETFE 18 | 6.3 | 20 | Glossy |
| Comparative Example 17 | Fluororubber + anti-blocking agent | 4.6 | 70 or longer | Rough skin |
| Comparative Example 18 | Fluororubber + PEG | 4.4 | 70 or longer | Rough skin |

Table 8 and FIGS. 6 and 7 show the following points. In the cases of Examples 27 to 34, the pressure drop (amount of pressure drop ΔP) was about 6 MPa or more, and the melt fracture was eliminated in 10 to 20 minutes.

In the cases of Comparative Examples 17 and 18, the pressure drop (amount of pressure drop ΔP) was smaller and the time to completion of the dropping (time to reach stable pressure) was longer than the values in the examples. The melt fracture was not eliminated completely even after 70 minutes from the start of the addition of the masterbatch.

Extrusion Evaluation 7

Example 35

A linear low density polyethylene (LLDPE 1201XV from Exxon Mobil Corporation) was mixed with the masterbatch containing ETFE 7 as the processing aid such that the masterbatch constituted 1 wt % of the total weight of the linear low density polyethylene and the masterbatch, and they were mixed by tumbling. The obtained masterbatch-containing linear low density polyethylene was extruded by a single-screw extruder (Rheomex OS from Haake Technik GmbH, L/D: 33, screw diameter: 20 mm, die diameter: 1.5 mmφ×40 mmL) with a cylinder temperature of 210° C. to 240° C., a die temperature of 240° C., and a screw speed of 70 rpm. Changes in the die pressure and melt fracture were observed.

Before each examination operation, 15 wt % silica-containing linear low density polyethylene was fed to a hopper, the screw speed was increased to 150 rpm, and the extruder was purged for about 15 minutes. The same linear low density polyethylene as that to be used in the examination (LLDPE 1201XV from Exxon Mobil Corporation) was fed, and the extruder was purged for about 15 minutes. The screw speed was then decreased back to 70 rpm, and the mixture was extruded until the temperature became stable. After the pressure was confirmed to be back to the initial pressure of 39.6 to 40.4 MPa, the subsequent experiment was performed. In the case that the pressure was not back to the initial pressure, the subsequent experiment was performed after the above purging was repeated until the pressure was back to the initial pressure.

The shear rate calculated from the equation of Eq. 1 was about 2,400 sec$^{-1}$.

Examples 36 to 38

The extrusion evaluation was performed in the same manner as in Example 35, except that the masterbatch that containing ETFE 7 as the processing aid, which was used in Example 35, and a masterbatch containing 5 wt % PEG were added to a linear low density polyethylene (LLDPE 1201XV from Exxon Mobil Corporation) such that the masterbatches respectively constituted 250 ppm/250 ppm, 250 ppm/125 ppm, or 100 ppm/200 ppm of the total weight of the linear low density polyethylene and the masterbatches, and they were mixed by tumbling.

Evaluation results in Examples 35 to 38 are shown in Table 9. Changes in the die pressure with time in each of Examples 35 to 38 are shown in FIG. 8.

TABLE 9

|  | Processing aid | | Amount of pressure drop (ΔP) (MPa) | Melt fracture elimina- tion time (min) | Examined appear- ance of extruded product |
| --- | --- | --- | --- | --- | --- |
|  | ETFE 7 (ppm) | PEG (ppm) | | | |
| Example 35 | 500 | 0 | 1.8 | 20 | Glossy |
| Example 36 | 250 | 250 | 2.3 | 20 | Glossy |
| Example 37 | 250 | 125 | 1.6 | 30 | Glossy |
| Example 38 | 100 | 200 | 1.8 | 30 | Glossy |

Figure 8:
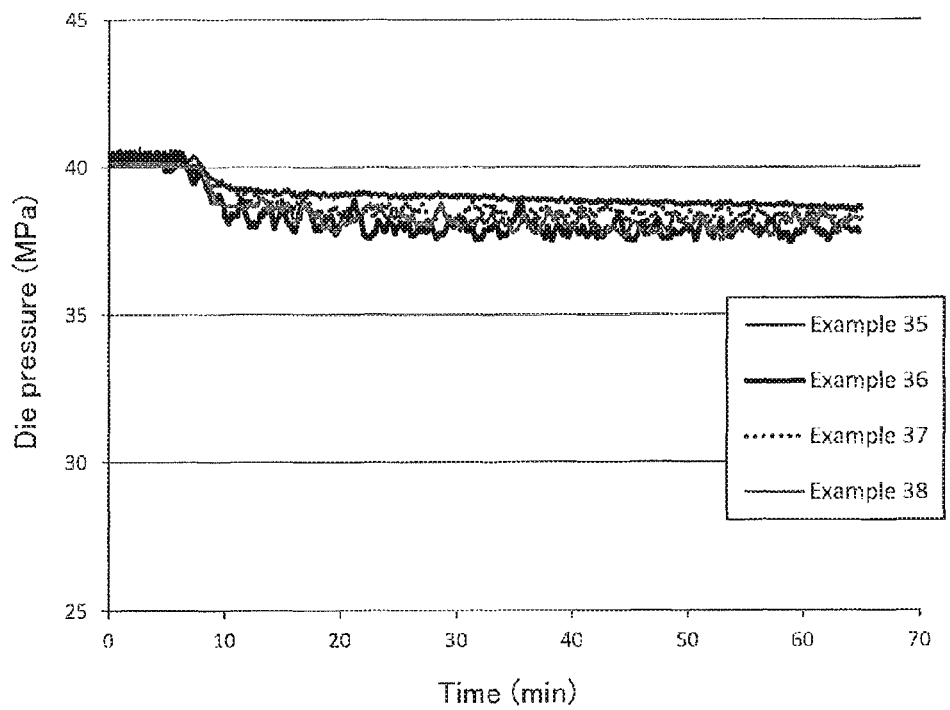
FIG. 8 is a graph showing changes in the die pressure with time during extrusion in each of Examples 35 to 38.

Table 9 and FIG. 8 show the following points. The results in Comparative Examples 17 and 18 show that the processing aids containing a fluororubber or a mixture of a fluororubber and a PEG could not eliminate melt fracture at a shear rate of about 1,200 sec$^{-1}$, whereas in Examples 35 to 38, the processing aids completely eliminated melt fracture even at a shear rate of about 2,400 sec$^{-1}$.

Extrusion Evaluation 8

Examples 39 to 41

The masterbatch containing ETFE 7 as the processing aid, which was used in Example 35, and a masterbatch containing 5 wt % PEG were added to a linear low density polyethylene (LLDPE 1201XV from Exxon Mobil Corporation) such that the ETFE 7 and PEG respectively constituted 50 ppm/450 ppm, 167 ppm/333 ppm, or 250 ppm/250 ppm of the total weight of the linear low density polyethylene and the two masterbatches, and they were mixed by tumbling. The obtained masterbatch-containing linear low density polyethylene was extruded by a single-screw extruder (Rheomex OS from Haake Technik GmbH, L/D: 33, screw diameter: 20 mm, die diameter: 2 mmϕ×40 mmL) with a cylinder temperature of 190° C. to 220° C., a die temperature of 220° C., and a screw speed of 80 rpm. Changes in the die pressure and melt fracture were observed.

Before each examination operation, 15 wt % silica-containing linear low density polyethylene was fed to a hopper, the screw speed was increased to 150 rpm, and the extruder was purged for about 15 minutes. The same linear low density polyethylene as that to be used in the examination (LLDPE 1201XV from Exxon Mobil Corporation) was fed, and the extruder was purged for about 15 minutes. The screw speed was then decreased back to 70 rpm, and the mixture was extruded until the temperature became stable. After the pressure was confirmed to be back to the initial pressure of 37.6 to 38.4 MPa, the subsequent experiment was performed. In the case that the pressure was not back to the initial pressure, the subsequent experiment was performed after the above purging was repeated until the pressure was back to the initial pressure. The shear rate calculated from the equation of Eq. 1 was about 1,200 sec$^{-1}$.

Comparative Example 19

The extrusion evaluation was performed in the same manner as in Example 39, except that the processing aid-containing masterbatch used in Comparative Example 13 was used.

Comparative Example 20

The extrusion evaluation was performed in the same manner as in Example 39, except that the processing aid-containing masterbatch used in Comparative Example 14 was used.

Evaluation results in each of Examples 39 to 41 and Comparative Examples 19 and 20 are shown in Table 10. Changes in the die pressure with time in each of Examples 39 to 41 and Comparative Examples 19 and 20 are shown in FIG. 9.

TABLE 10

|  | Processing aid | | Amount of pressure drop (ΔP) (MPa) | Melt fracture elimina- tion time (min) | Examined appear- ance of extruded product |
| --- | --- | --- | --- | --- | --- |
|  | ETFE 7 (ppm) | PEG (ppm) | | | |
| Example 39 | 50 | 450 | 4.8 | 40 | Glossy |
| Example 40 | 167 | 333 | 4.2 | 30 | Glossy |
| Example 41 | 250 | 250 | 4.7 | 10 | Glossy |
| Comparative Example 19 | Fluororubber + anti-blocking agent | | 3.6 | 70 or longer | Rough skin |
| Comparative Example 20 | Fluororubber + PEG | | 3.0 | 70 or longer | Rough skin |

Figure 9:
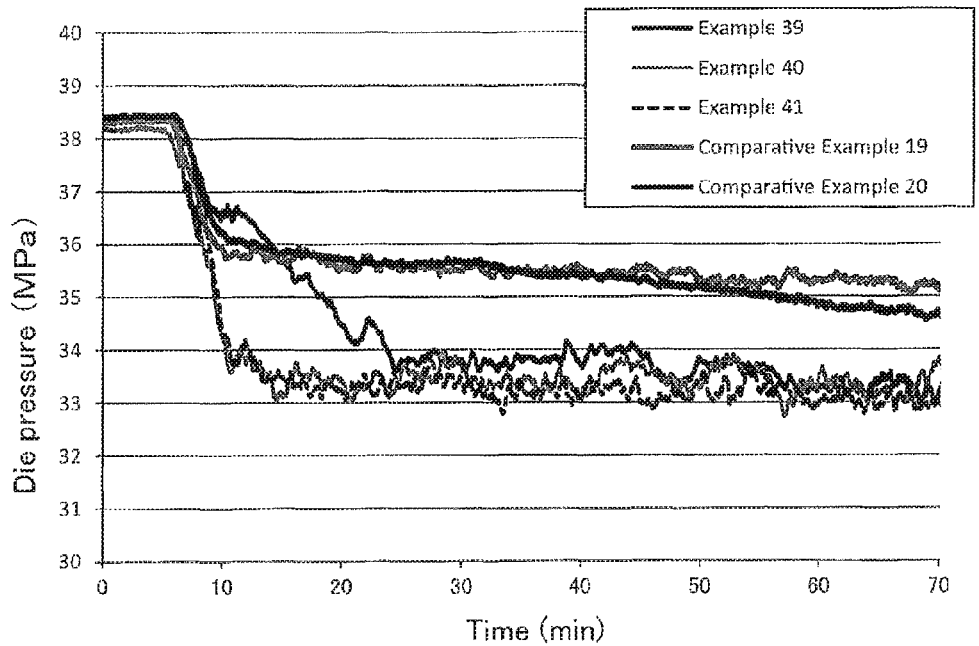
FIG. 9 is a graph showing changes in the die pressure with time during extrusion in each of Examples 39 to 41 and Comparative Examples 19 and 20.

Table 10 and FIG. 9 show the following points. In each of Examples 39 to 41, the pressure dropped by 4.2 MPa or more. The time to melt fracture elimination was 10 to 40 minutes, and became shorter as the amount of the ETFE 7 added increased. In each of Comparative Examples 19 and 20, the amount of pressure drop was smaller than those in Examples 39 to 41, and the melt fracture was not eliminated completely even after 70 minutes from the start of the addition of the masterbatch.

Extrusion Evaluation 9

Examples 42 and 43

The ETFE 7 and PEG used in Example 35 were premixed at a mass % ratio of ETFE 7/PEG of 20/80 or 50/50 to prepare a processing aid. The processing aid was added to a linear low density polyethylene (LLDPE 1201XV from Exxon Mobil Corporation) such that the proportion of the processing aid was 5 wt %, whereby a masterbatch was produced.

The obtained masterbatch was added to a linear low density polyethylene (LLDPE 1201XV from Exxon Mobil Corporation) such that the processing aid constituted 500 ppm of the total weight of the linear low density polyethylene and the masterbatch, and they were mixed by tumbling. The extrusion evaluation was performed in the same manner as in Example 39.

Evaluation results in each of Examples 42 and 43 and Comparative Examples 19 and 20 are shown in Table 11. Changes in the die pressure with time in each of Examples 42 and 43 and Comparative Examples 19 and 20 are shown in FIG. 10.

TABLE 11

| | Processing aid | Amount of pressure drop (ΔP) (MPa) | Melt fracture elimination time (min) | Examined appearance of extruded product |
|---|---|---|---|---|
| Example 42 | ETFE 7/PEG = 20/80 | 4.8 | 20 | Glossy |
| Example 43 | ETFE 7/PEG = 50/50 | 4.7 | 20 | Glossy |
| Comparative Example 19 | Fluororubber + anti-blocking agent | 3.6 | 70 or longer | Rough skin |
| Comparative Example 20 | Fluororubber + PEG | 3.0 | 70 or longer | Rough skin |

Figure 10:
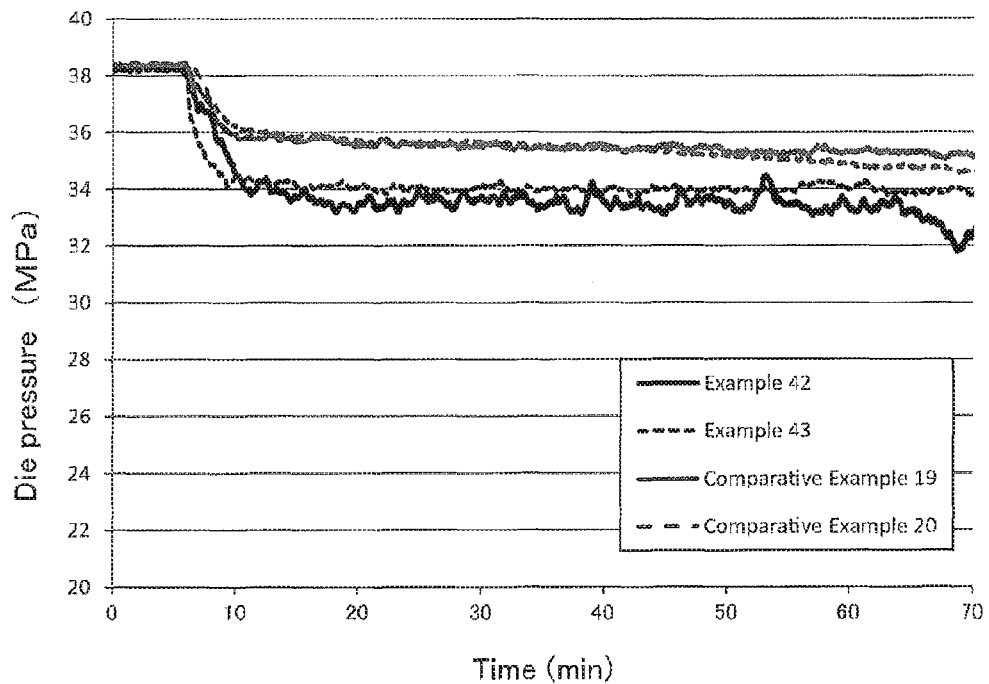
FIG. 10 is a graph showing changes in the die pressure with time during extrusion in each of Examples 42 and 43 and Comparative Examples 19 and 20.

Table 11 and FIG. 10 show the following points. In each of Examples 42 and 43, the pressure dropped by about 4.7 MPa. The melt fracture was completely eliminated in 20 minutes. In each of Comparative Examples 19 and 20, the amount of pressure drop was smaller than those in Examples 42 and 43, and the melt fracture was not eliminated completely even after 70 minutes from the start of the addition of the masterbatch.

Extrusion Evaluation 10

Examples 44 and 45, Comparative Examples 21 and 22

The extrusion evaluation was performed in the same manner as in Example 27, except that the processing aid-containing masterbatch used in one of Examples 22 and 26 and Comparative Examples 13 and 14 was used, the cylinder temperature was 170° C. to 200° C., and the die temperature was 200° C.

Figure 11:
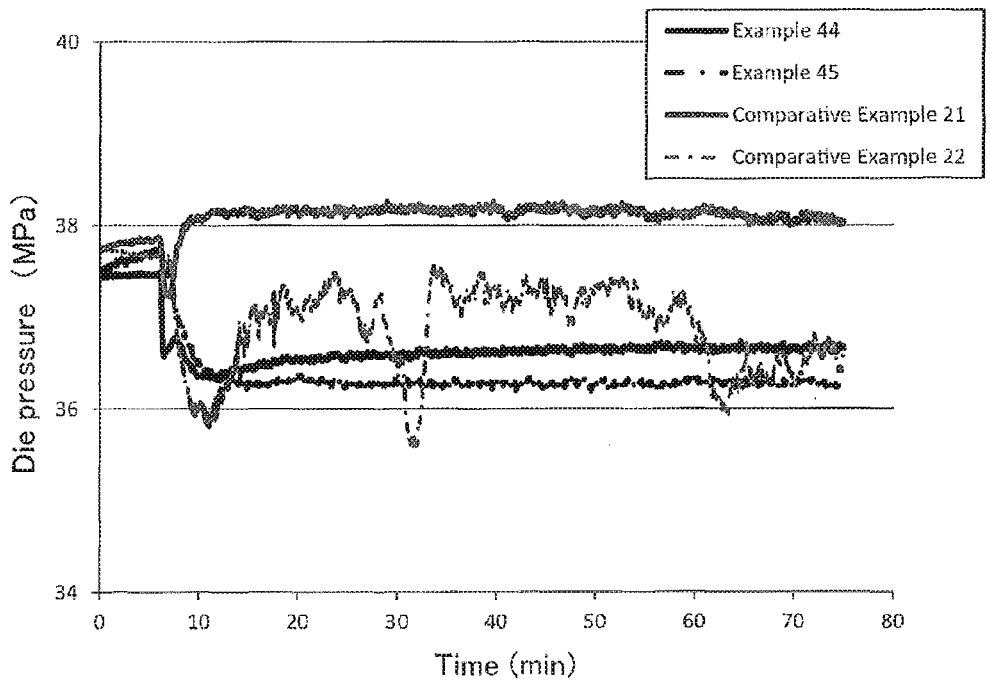
FIG. 11 is a graph showing changes in the die pressure with time during extrusion in each of Examples 44 and 45 and Comparative Examples 21 and 22.

Evaluation results in each of Examples 44 and 45 and Comparative Examples 21 and 22 are shown in Table 12. Changes in the die pressure with time in each of Examples 44 and 45 and Comparative Examples 21 and 22 are shown in FIG. 11.

TABLE 12

| | Processing aid | Amount of pressure drop (ΔP) (MPa) | Melt fracture elimination time (min) | Examined appearance of extruded product |
|---|---|---|---|---|
| Example 44 | ETFE 14 | 0.79 | 10 | Glossy |
| Example 45 | ETFE 18 | 1.5 | 10 | Glossy |

TABLE 12-continued

| | Processing aid | Amount of pressure drop (ΔP) (MPa) | Melt fracture elimination time (min) | Examined appearance of extruded product |
|---|---|---|---|---|
| Comparative Example 21 | Fluororubber + anti-blocking agent | *1) | 70 or longer | Rough skin |
| Comparative Example 22 | Fluororubber + PEG | *2) | 70 or longer | Rough skin |

*1) The extrusion pressure increased by 0.5 MPa
*2) The extrusion was unstable

Table 12 and FIG. 11 show the following points. In each of Examples 44 and 45, the pressure dropped by about 0.8 to 1.5 MPa in 20 minutes from the start of the addition of the masterbatch, and the melt fracture was completely eliminated in 10 minutes. In each of Comparative Examples 21 and 22, the pressure dropped in a short time, but the melt fracture was not eliminated completely even after 70 minutes from the start of the addition of the masterbatch.

INDUSTRIAL APPLICABILITY

The processing aid for polyolefins and the polyolefin composition of the present invention, each having the above composition, can be used in wide applications such as various films, bags, covering materials, tableware such as beverage containers, electric wires, cables, pipes, fibers, bottles, gasoline tanks, and any other various industrial molded articles.

The invention claimed is:
1. A polyolefin composition comprising
(i) a processing aid for polyolefins comprising an ethylene/tetrafluoroethylene copolymer as the only fluoropolymer,
the ethylene/tetrafluoroethylene copolymer having a melting point of 180° C. to 230° C.,
wherein the ethylene/tetrafluoroethylene copolymer consists of an ethylene-based polymerization unit (a), a tetrafluoroethylene-based polymerization unit (b), and a polymerization unit (c) based on a monomer represented by the following formula (1):

$$CH_2=CXY \qquad (1)$$

wherein X represents a hydrogen atom or a fluorine atom, and Y represents a fluoroalkyl group,
the copolymer has a mol % ratio (a)/(b) of the polymerization unit (a) to the polymerization unit (b) of 10:90 to 50:50, and
the copolymer contains the polymerization unit (c) in a proportion of 0.01 to 10 mol % based on the total amount of the polymerization unit (a) and the polymerization unit (b), and
(ii) a polyolefin,
the processing aid for polyolefins constituting 0.0005 to 10 wt % of the total weight of the composition,
the processing aid for polyolefins being dispersed as particles in the polyolefin,
the processing aid for polyolefins having an average dispersed particle size of 10 μm or smaller in the polyolefin,
wherein the ethylene/tetrafluoroethylene copolymer is the only fluoropolymer present in the polyolefin composition.
2. The polyolefin composition according to claim 1, wherein the polyolefin is at least one selected from the group consisting of low density polyethylene, linear low density polyethylene, high density polyethylene, metallocene-catalyzed linear low density polyethylene, polypropylene, polystyrene, and polyvinyl chloride.

3. The processing composition according to claim 1, wherein the monomer represented by formula (1) is a monomer represented by the following formula (2):

$$CH_2=CX-(CF_2)_n-Z \tag{2}$$

wherein X and Z are the same as or different from each other and each represent a hydrogen atom or a fluorine atom, and n is an integer of 2 to 8.

4. The processing composition according to claim 1, wherein the ethylene/tetrafluoroethylene copolymer contains, at a main chain terminal or in a side chain, at least one group selected from the group consisting of —CONH$_2$, —OCOOR wherein R is a C1-C6 alkyl group, —CH$_2$OH, —COF, and —COOH.

5. The polyolefins composition according to claim 1, wherein the processing aid for polyolefins further comprises 1 to 99 wt % of at least one surfactant selected from the group consisting of silicone/polyether copolymers, aliphatic polyesters, aromatic polyesters, polyether polyols, amine oxides, carboxylic acids, aliphatic esters, and poly(oxyalkylenes).

* * * * *